(12) United States Patent  (10) Patent No.: US 8,755,060 B2
Torii  (45) Date of Patent: Jun. 17, 2014

(54) PRINT CONTROL APPARATUS, IMAGE FORMING SYSTEM, AND NON-TRANSITORY COMPUTER READABLE MEDIUM

(71) Applicant: FUJI XEROX Co., Ltd., Tokyo (JP)

(72) Inventor: Takeshi Torii, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/749,197

(22) Filed: Jan. 24, 2013

(65) Prior Publication Data

US 2013/0194598 A1  Aug. 1, 2013

(30) Foreign Application Priority Data

Feb. 1, 2012 (JP) .................................. 2012-019624

(51) Int. Cl.
  G06F 3/12 (2006.01)
  G06K 15/00 (2006.01)
  G06F 15/80 (2006.01)

(52) U.S. Cl.
  USPC ....... 358/1.13; 358/1.15; 358/1.17; 358/1.18; 712/15

(58) Field of Classification Search
  None
  See application file for complete search history.

(56) References Cited

U.S. PATENT DOCUMENTS

| | | | | |
|---|---|---|---|---|
| 6,348,975 | B1* | 2/2002 | Tsunekawa et al. | 358/1.17 |
| 2001/0019671 | A1* | 9/2001 | Tokura | 399/82 |
| 2004/0061892 | A1* | 4/2004 | Ferlitsch | 358/1.15 |
| 2005/0200871 | A1 | 9/2005 | Miyata | |
| 2009/0153892 | A1 | 6/2009 | Torii | |
| 2010/0165806 | A1* | 7/2010 | Mikami et al. | 369/47.5 |
| 2011/0317205 | A1* | 12/2011 | Naito et al. | 358/1.15 |
| 2012/0026520 | A1 | 2/2012 | Torii | |

FOREIGN PATENT DOCUMENTS

| | | |
|---|---|---|
| JP | 2004-310762 A | 11/2004 |
| JP | 2005-242937 A | 9/2005 |
| JP | 2006-159738 A | 6/2006 |
| JP | 2008-015605 A | 1/2008 |
| JP | 2009-146251 A | 7/2009 |
| JP | 2010-277273 A | 12/2010 |
| JP | 2011-051234 A | 3/2011 |

OTHER PUBLICATIONS

Notification of Reasons for Refusal for JP Application No. 2012-019624 dated Aug. 2, 2012.

* cited by examiner

*Primary Examiner* — Thomas Lett

(74) *Attorney, Agent, or Firm* — Sughrue Mion, PLLC

(57) ABSTRACT

A print control apparatus includes rendering units performing rendering in response to a print instruction described in a page description language; a print instruction storage unit storing the print instruction for printing pages; a distribution unit sequentially distributing process requests, each specifying which page is to be rendered, and reference information for accessing the print instruction, to the rendering units; and a process request storage unit storing process requests. The rendering units each execute rendering by accessing the print instruction based on the reference information, and extracting a part of the print instruction of a specified page to image data. The distribution unit distributes a process request when there is a rendering unit to which the process request is distributable in ascending order, and, when there is no such rendering unit, stores the process request, and selects and distributes a smallest-page-number process request to one rendering unit.

10 Claims, 25 Drawing Sheets

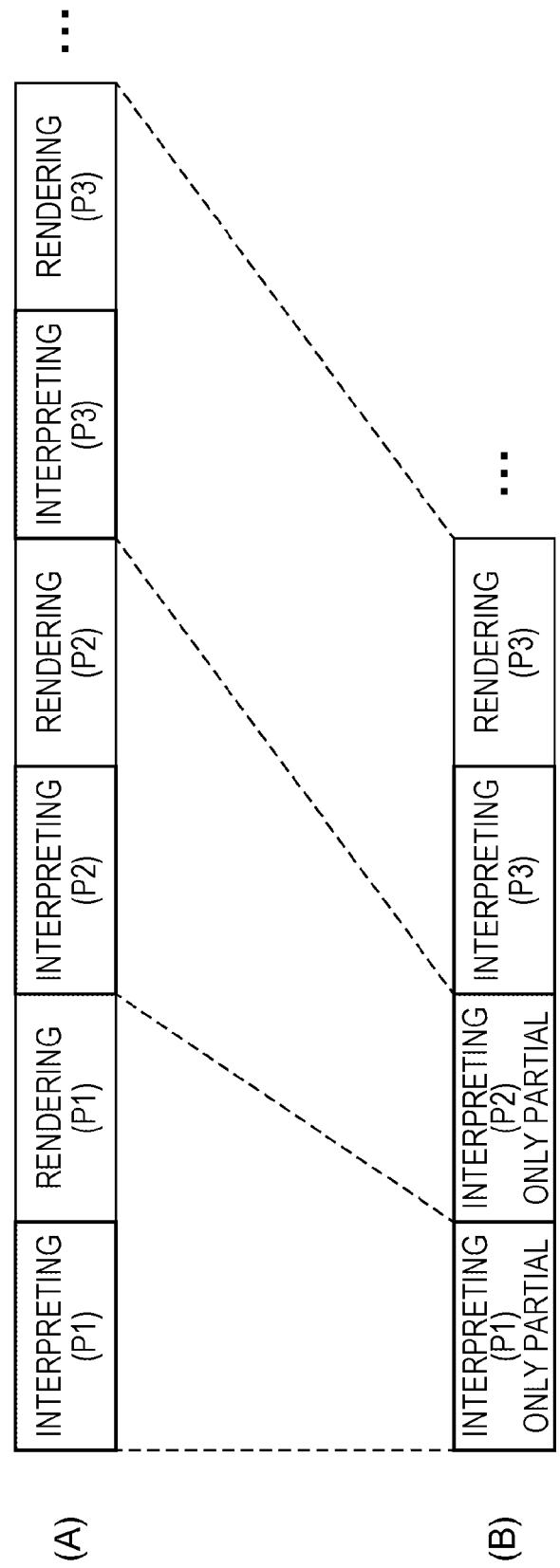

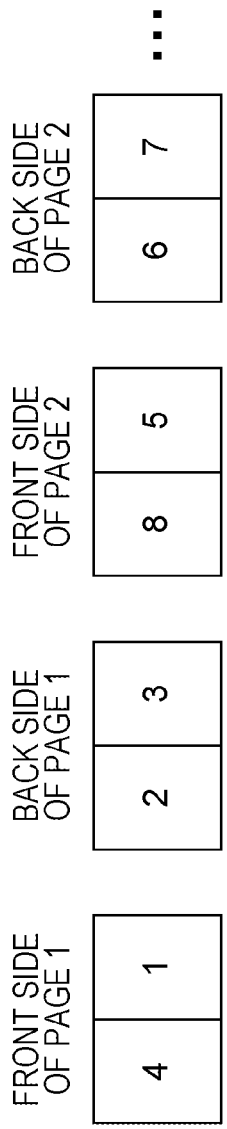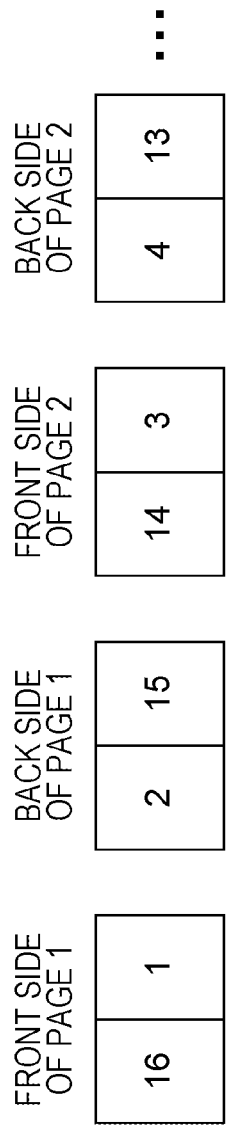

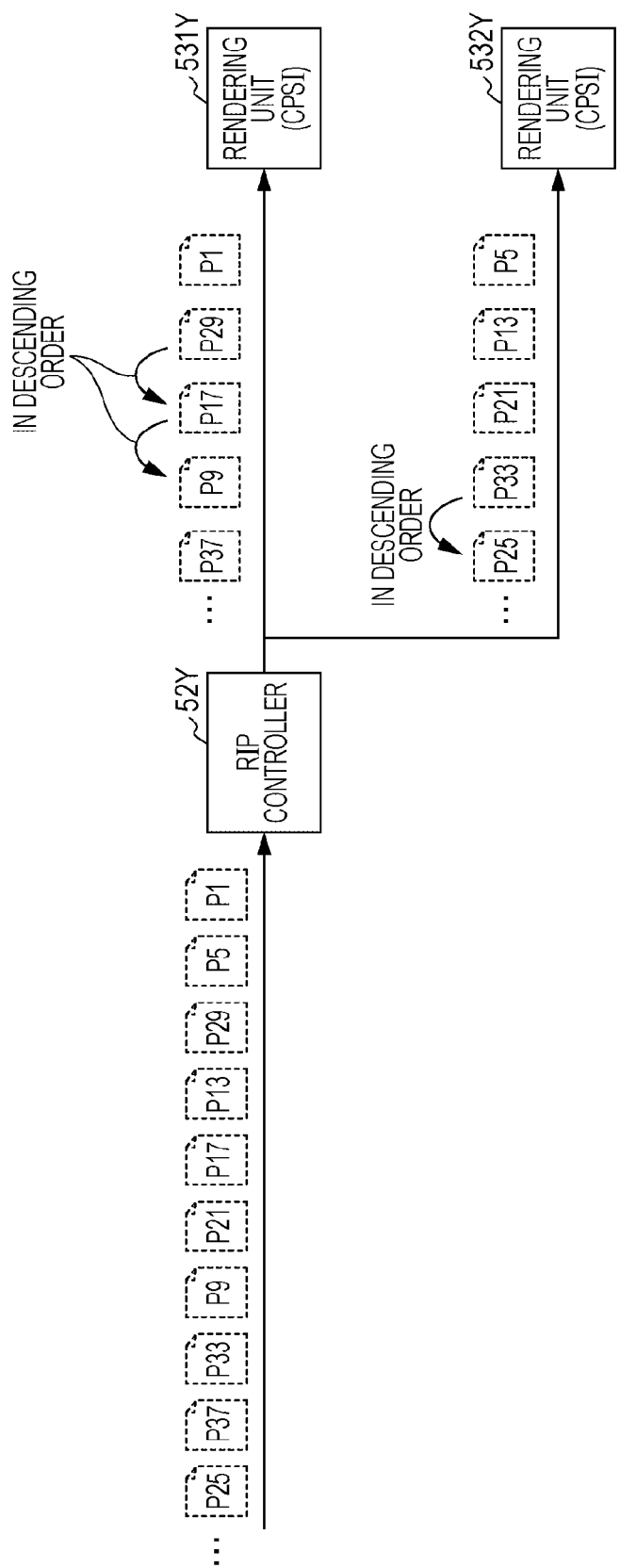

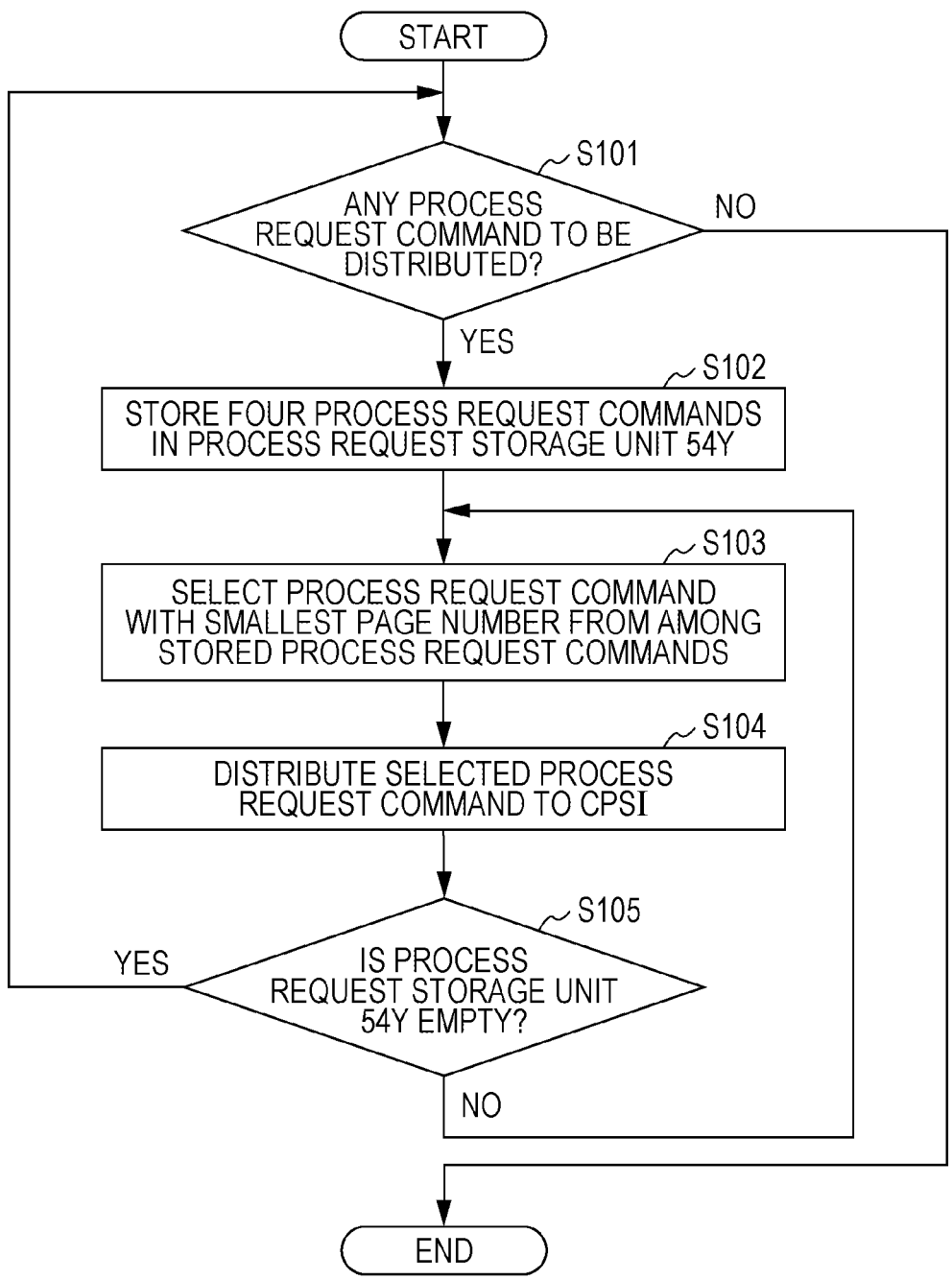

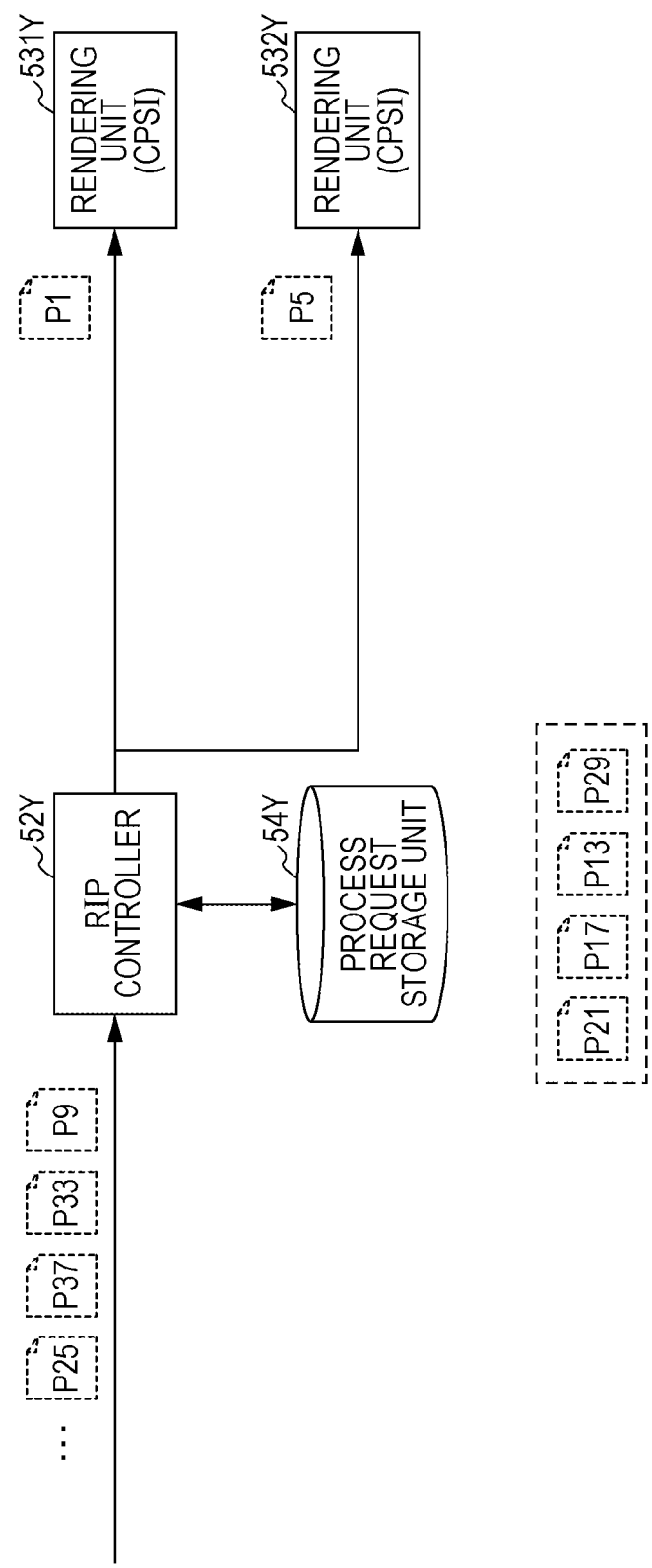

PRINT CONTROL APPARATUS, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-019624 filed Feb. 1, 2012.

BACKGROUND

Technical Field

The present invention relates to a print control apparatus, an image forming system, and a non-transitory computer readable medium.

SUMMARY

According to an aspect of the invention, there is provided a print control apparatus including multiple rendering units, a print instruction storage unit, a distribution unit, and a process request storage unit. The rendering units perform rendering in response to a print instruction described in a page description language. The print instruction storage unit stores the print instruction for printing multiple pages. The distribution unit sequentially distributes process requests and reference information to the rendering units. Each of the process requests specifies which of the pages is to be rendered. The reference information is for accessing the print instruction stored in the print instruction storage unit. The process request storage unit is capable of storing the process requests. The rendering units each execute rendering by accessing the print instruction stored in the print instruction storage unit on the basis of the reference information distributed by the distribution unit, and extracting a part of the print instruction of a page specified by a corresponding one of the process requests distributed by the distribution unit to image data. When there is a rendering unit to which a process request is distributable in ascending order of page numbers, the distribution unit distributes the process request to the rendering unit to which the process request is distributable in ascending order, and, when there is no rendering unit to which a process request is distributable in ascending order of the page numbers, the distribution unit temporarily stores the process request in the process request storage unit, selects a process request with a smallest page number from among multiple process requests stored in the process request storage unit and distributes the selected process request to one of the rendering units.

BRIEF DESCRIPTION OF THE DRAWINGS

Exemplary embodiments of the present invention will be described in detail based on the following figures, wherein:

FIG. 6 includes diagrams for describing a page skip function of a Configurable PostScript Interpreter (CPSI);

FIGS. 7A and 7B are diagrams for describing specific examples of imposition processing when book printing is performed;

FIG. 8 is a diagram illustrating the manner in the case where, when a print job including pages that are not in consecutive order is to be executed, process request commands are mechanically distributed to rendering units that are not in a process wait state;

FIG. 9 is a flowchart illustrating the flow of an operation process performed by a RIP controller;

FIG. 10 is a diagram illustrating the operation of the RIP controller distributing process request commands in the case where the print job illustrated in FIGS. 7A and 7B is to be extracted to print data;

DETAILED DESCRIPTION

Exemplary embodiments of the invention will be described in detail with reference to the drawings.

First Exemplary Embodiment

Figure 1:
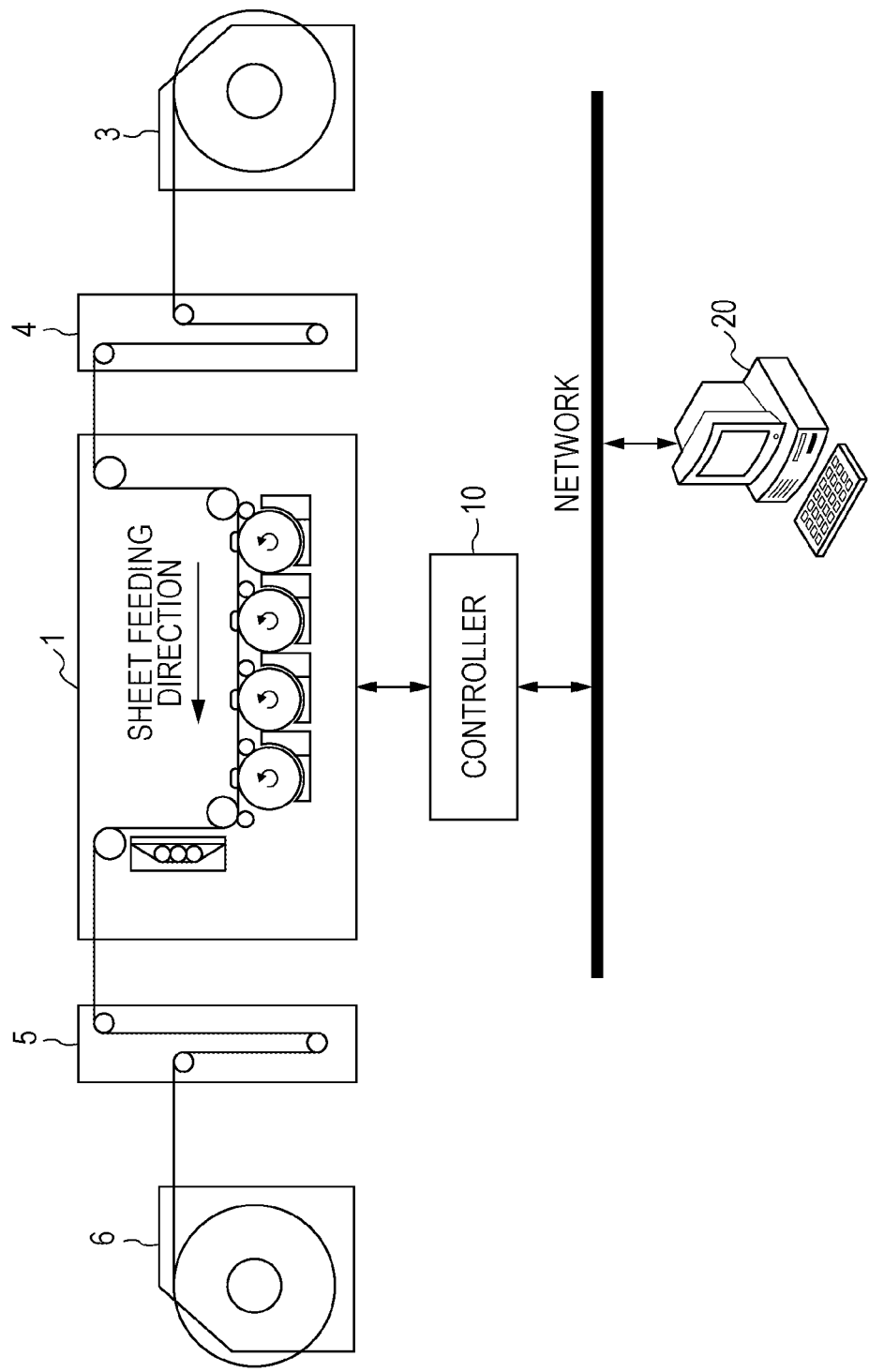
FIG. 1 is a diagram illustrating the system configuration of a print system according to a first exemplary embodiment of the invention.

FIG. 1 is a diagram illustrating an example of the configuration of a print system (image forming system) according to a first exemplary embodiment of the invention. The print system includes, as illustrated in FIG. 1, a pre-processor 3, a buffer apparatus 4, a printer (image output apparatus) 1 that performs printing on continuous paper, a buffer apparatus 5, a post-processor 6, a controller (print control apparatus) 10, and a terminal apparatus 20.

The pre-processor 3 performs pre-processing such as feeding unprinted print paper. The post-processor 6 performs post-processing such as winding printed print paper. The buffer apparatuses 4 and 5 are provided to maintain, for example, the tension of print paper between the pre-processor 3 and the printer 1 and between the printer 1 and the post-processor 6, respectively.

The terminal apparatus 20 generates print instructions such as print jobs and sends the generated print instructions to the controller 10 via a network. The controller 10 functions as a print control apparatus that controls the print operation of the printer 1 in response to a print instruction sent from the terminal apparatus 20. The printer 1 outputs images on continuous paper in accordance with the print instruction under control of the controller 10.

Figure 2:
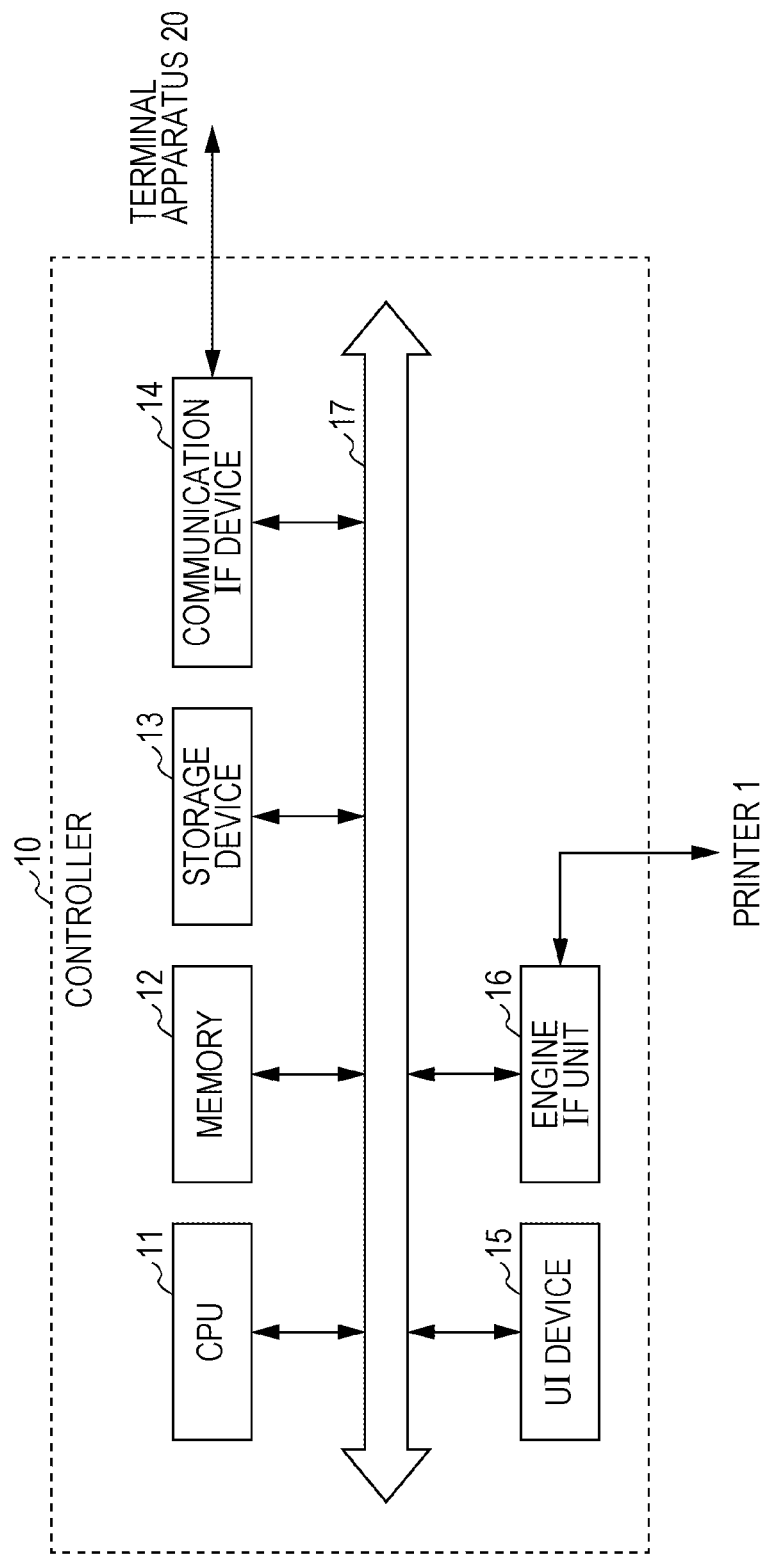
FIG. 2 is a block diagram illustrating the hardware configuration of a controller in the print system according to the first exemplary embodiment of the invention.

Next, the hardware configuration of the controller 10 in the print system according to the exemplary embodiment will be described with reference to FIG. 2. The controller 10 of the exemplary embodiment includes, as illustrated in FIG. 2, a central processing unit (CPU) 11, a memory 12, a storage device 13 such as a hard disk drive (HDD), a communication interface (IF) device 14 that sends and receives data to and from the terminal apparatus 20 via a network, a user interface (UI) device 15 that includes a touch panel and a liquid crystal display, and an engine IF device 16 that sends and receives data to and from the printer 1. These elements are interconnected via a control bus 17.

The CPU 11 executes certain processing on the basis of a print control program stored in the memory 12 or the storage device 13 and controls the operation of the controller 10.

Note that, in the exemplary embodiment, it has been described that the CPU 11 reads and executes the control program stored in the memory 12 or the storage device 13. However, the program may be stored in a portable storage medium such as a compact-disc read-only memory (CD-ROM) and provided to the CPU 11.

Figure 3:
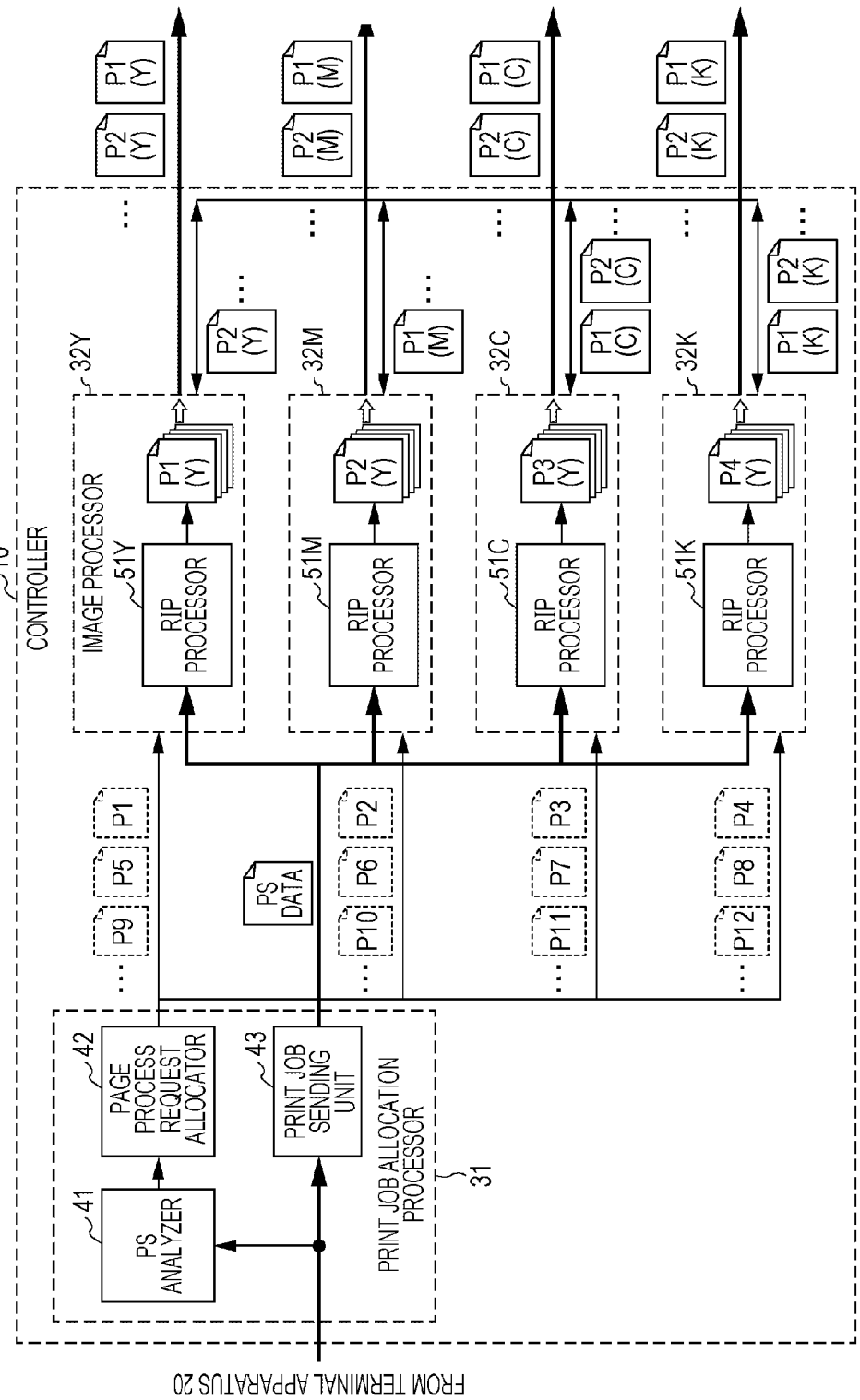
FIG. 3 is a block diagram illustrating the functional configuration of the controller in the print system according to the first exemplary embodiment of the invention.

FIG. 3 is a block diagram illustrating the functional configuration of the controller 10 realized by executing the above-described control program.

The controller 10 of the exemplary embodiment includes, as illustrated in FIG. 3, a print job allocation processor 31 and four image processors 32Y to 32K provided for the individual basic colors that the image processors 32Y to 32K are respectively in charge of.

Note that the basic colors are colors that multiple image processors, provided for the individual print basic colors, are in charge of. For example, when the print basic colors are four colors, namely, yellow, magenta, cyan, and black, the basic colors are colors that image processors provided for these individual colors are in charge of.

The print job allocation processor 31 has the function of analyzing a command in a print job (print instruction) sent from the terminal apparatus 20. The print job allocation processor 31 includes a PostScript (PS) analyzer 41, a page process request allocator 42, and a print job sending unit 43.

In many cases, page description languages (PDLs) are used to describe print jobs sent from the terminal apparatus 20.

Page description languages include page-dependent page description languages in which the details of a change of a print resource on a certain page are applied to other pages, and page-independent page description languages in which information necessary for rendering a certain page is collectively described on a page-by-page basis. That is, a print job represented in a page-independent page description language is relatively easily divided in units of pages, whereas a print job represented in a page-dependent page description language is not easily divided in units of pages.

For example, Portable Document Format (PDF) is a page-independent page description language, and PostScript (registered trademark) is a page-dependent page description language.

In the exemplary embodiment, a print job represented in PostScript will be described as an example of a page-dependent print job. However, the exemplary embodiment is similarly applicable to any print job as long as it is represented in a page-dependent page description language.

The print job sending unit 43 sends the entirety of a print job including multiple pages, which has been sent from the terminal apparatus 20, to the four image processors 32Y to 32K before printing starts.

When PostScript data, which is a page-dependent print job, is sent from the terminal apparatus 20, the PS analyzer 41 analyzes commands and analyzes attributes such as the number of pages and the like.

With reference to the analysis results obtained by the PS analyzer 41, the page process request allocator 42 sequentially sends process request commands to the four image processors 32Y to 32K. A process request command specifies which of the pages included in the print job is to be image-processed. Here, the page process request allocator 42 sequentially allocates the process request commands to the image processors 32Y to 32K in a page order specified by the print job.

The image processors 32Y to 32K have raster image processing (RIP) processors 51Y to 51K, respectively, for extracting image data of pages specified by the process request commands, sent from the page process request allocator 42, to print data for the individual colors.

Note that the image processors 32Y to 32K have the transfer function and the output function. The transfer function transfers, of the print data extracted on a color-by-color basis by the RIP processors 51Y to 51K, print data of colors other than the basic colors that the image processors 32Y to 32K are in charge of to image processors of the other colors. The output function outputs the print data of the basic colors that the image processors 32Y to 32K are in charge of, which has been extracted by the RIP processors 51Y to 51K, and the print data of basic colors transferred from the image processors of the other colors.

Note that the controller 10 includes print controllers that control print mechanisms of the individual colors in the printer 1 and output images onto print paper on the basis of print data generated by the image processors 32Y to 32K. However, these print controllers are not illustrated in FIG. 3.

In the example illustrated in FIG. 3, process request commands that specify rendering of image data of page 1 (P1), page 5 (P5), page 9 (P9), . . . are sent to the image processor 32Y.

Similarly, process request commands that specify rendering of image data of page 2 (P2), page 6 (P6), page 10 (P10), . . . are sent to the image processor 32M; process request commands that specify rendering of image data of page 3 (P3), page 7 (P7), page 11 (P11), . . . are sent to the image processor 32C; and process request commands that specify rendering of image data of page 4 (P4), page 8 (P8) page 12 (P12), . . . are sent to the image processor 32K.

In the image processor 32Y, at first, the RIP processor 51Y performs a rasterizing process of extracting, of the entire PostScript data sent from the print job sending unit 43, image data of page 1 to print data for the individual colors. Further, the image processor 32Y transfers, of the rasterized print data, magenta print data P1(M) to the image processor 32M, cyan print data P1(C) to the image processor 32C, and black print data P1(K) to the image processor 32K.

Similarly, in the image processor 32M, at first, the RIP processor 51M performs a rasterizing process of extracting, of the entire PostScript data sent from the print job sending unit 43, image data of page 2 to print data for the individual colors. Further, the image processor 32M transfers, of the rasterized print data, yellow print data P2(Y) to the image processor 32Y, cyan print data P2(C) to the image processor 32C, and black print data P2(K) to the image processor 32K.

In this manner, the image processors 32Y to 32K sequentially perform rasterizing of the individual pages and transfer the obtained print data for the individual colors to the image processors of the corresponding colors. On the basis of the generated print data for the individual colors, the print controllers (not illustrated), provided for the individual colors, control the print mechanisms of the individual colors in the printer 1 and execute outputting to print paper.

Next, the configuration of the RIP processors 51Y to 51K will be described. Although the configuration of the RIP processor 51Y is described with reference to FIG. 4 here, the same or similar applies to the configuration of the RIP processors 51M to 51K.

Figure 4:
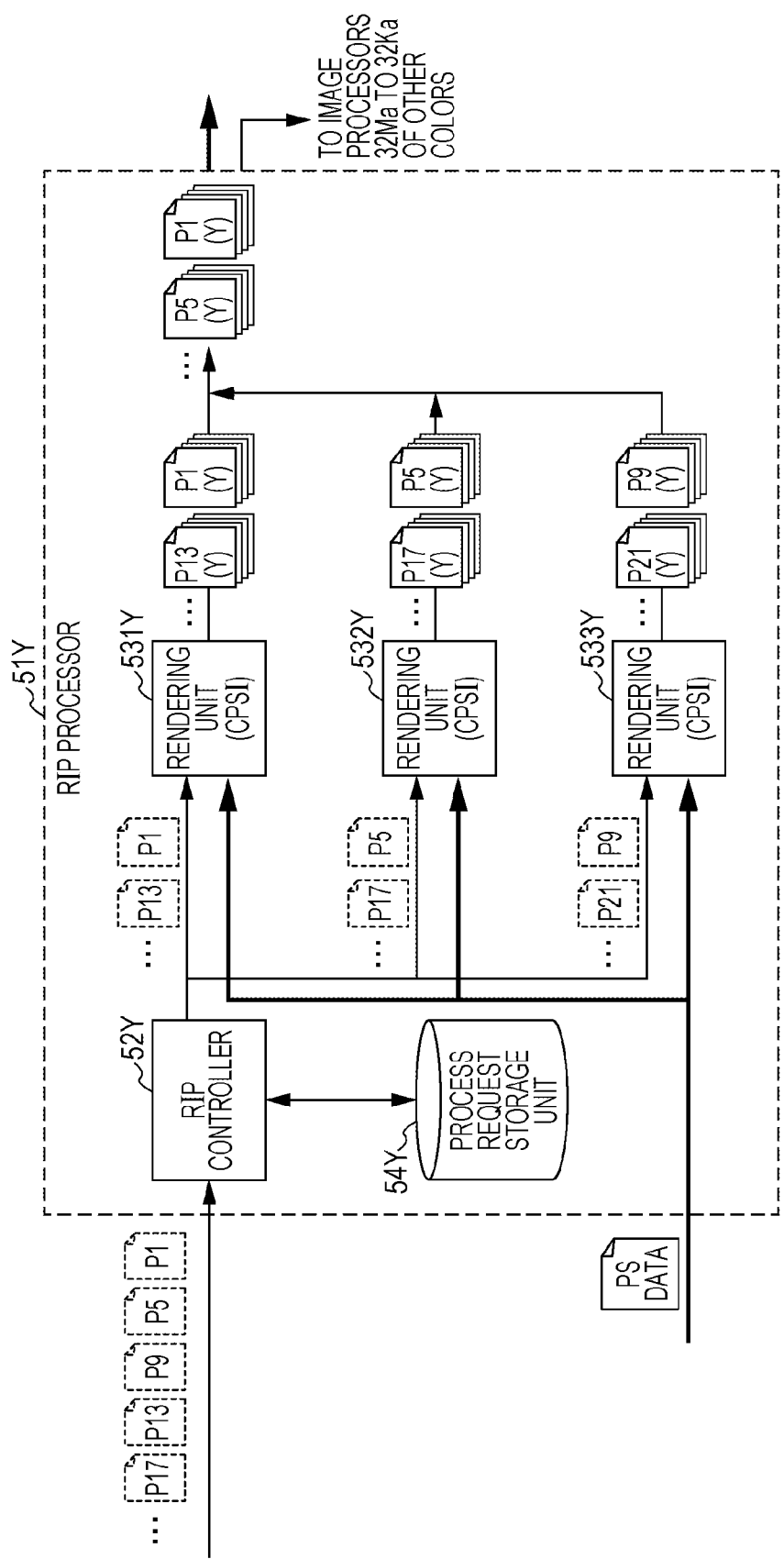
FIG. 4 is a block diagram illustrating the configuration of a raster image processing (RIP) processor illustrated in FIG. 3.

The RIP processor 51Y includes, as illustrated in FIG. 4, an RIP controller 52Y, three rendering units 531Y to 533Y, and a process request storage unit 54Y.

The RIP controller 52Y sequentially distributes process request commands, allocated by the page process request allocator 42, to the three rendering units 531Y to 533Y.

The process request storage unit 54Y is capable of storing multiple process request commands. Note that, in this exemplary embodiment, to simplify the description, the process request storage unit 54Y is described as being capable of storing four process request commands. However, the number of process request commands that may be stored is determined on the basis of the storage capacity of the process request storage unit 54Y. The greater the storage capacity of the process request storage unit 54Y, the greater the number of process request commands that may be stored. Thus, this exemplary embodiment is not limited to the case where four process request commands are stored.

The rendering units 531Y to 533Y are realized with software named Configurable PostScript Interpreter (CPSI). The rendering units 531Y to 533Y perform rendering in response to a print job described in PostScript and generate print data in a raster format. The rendering units 531Y to 533Y each have a buffer memory capable of storing print data corresponding to a generated few pages. The rendering units 531Y to 533Y are configured to store the process request commands, distributed from the RIP controller 52Y, in a queue in the distributed order.

The print mechanism corresponding to the Y color in the printer 1 outputs an image on the basis of print data obtained by rendering performed by the multiple rendering units 531Y to 533Y.

Note that, since process request commands are sent by the RIP controller 52Y, the rendering units 531Y to 533Y each execute rendering by extracting the print job of a page specified by a corresponding one of the process request commands distributed from the RIP controller 52Y, and generate print data.

Note that, in the example illustrated in FIG. 4, the case in which the RIP controller 52Y distributes process request commands, in order, to the three rendering units 531Y to 533Y is illustrated. However, the RIP controller 52Y in this exemplary embodiment not only distributes process request commands in a determined order, but also temporarily stores four process request commands to be distributed in the process request storage unit 54Y, and then distributes the four process request commands, stored in the process request storage unit 54Y, to the three rendering units 531Y to 533Y in an order different from the order of storage so that the pages are in ascending order.

Here, distribution in a page ascending order refers to distribution of process request commands in which a page specified by a process request command distributed the next time is subsequent to a page specified by a process request command distributed the previous time. In other words, when a process request command specifying rendering of page 3 and then a process request command specifying rendering of page 4 are distributed, the process request commands are distributed in ascending order.

The reason the RIP controller 52Y distributes process request commands to the three rendering units 531Y to 533Y so that the pages are in ascending order will be described below.

As described above, PostScript is a page-dependent page description language. Therefore, print resources such as a font and form set on a certain page are effective on other pages.

For example, referring to FIG. 5, the case in which the setting of a print resource (OOO) is set to "A" on page 1 and is changed to "B" on page 3 will be described.

Figure 5:
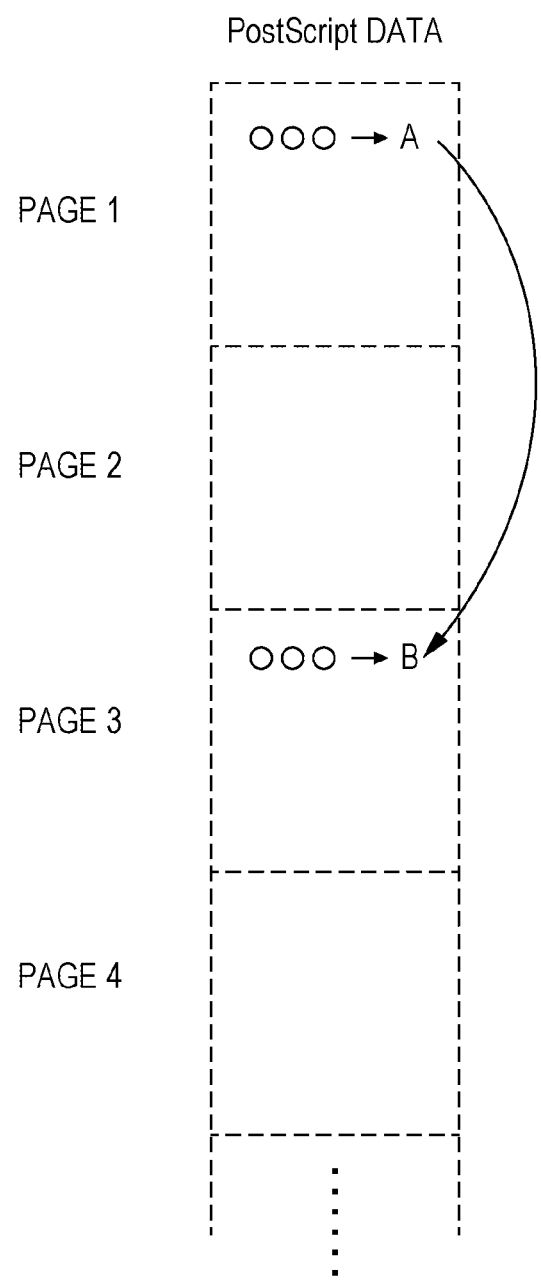
FIG. 5 is a diagram for describing the structure of PostScript data.

In a case such as that illustrated in FIG. 5, when rendering of page 4 is to be performed using this print resource, if a command on page 3 is not executed, rendering of page 4 is not normally performed. Thus, it is necessary to execute commands on the first to third pages when rendering of a print job of page 4 is to be performed.

When rendering of a print job of page 2 is to be performed after rendering of the print job of page 4 is finished, since the setting of the print resource (OOO) has already been set to "B", normal rendering is unexecutable when rendering of the print job of page 2 is performed as it is.

Thus, when process request commands are distributed in descending order in which a page specified by the current process request command is prior to a page specified by the previous process request command, the rendering units 531Y to 533Y re-execute processing of the sent print job from the first page.

Specifically, when rendering of page 2, which is prior to page 4, is specified by a process request command after rendering of page 4 is specified by a process request command, the rendering units 531Y to 533Y re-execute processing of the sent print job from page 1, which is the first page.

In fact, when the RIP controller 52Y distributes process request commands in descending order to the rendering units 531Y to 533Y, the rendering units 531Y to 533Y are restarted and controlled to re-execute the print job from the first page.

For the above-described reason, the RIP controller 52Y distributes process request commands in ascending order to the three rendering units 531Y to 533Y.

The rendering units 531Y to 533Y perform rendering of pages specified by process request commands distributed from the RIP controller 52Y as above. When all commands from the first page of a print job to a specified page are executed, there is no advantage in performing parallel processing using the three rendering units 531Y to 533Y.

Therefore, the rendering units 531Y to 533Y perform rendering of pages specified by process request commands distributed from the RIP controller 52Y by using a page skip function that executes only a command that affects the print setting of subsequent pages in data of individual pages of a print job.

Here, a page description language includes a control command and a rendering command. A control command is a command that changes a print resource such as the specification of a font and form to be used, or a command that sets a page break or the like. A rendering command is a command for generating print data in a raster format by using a print resource specified by a control command.

Since a page description language has such a configuration, processing for executing a print job represented in a page description language is divided into interpreting processing that analyzes a control command and rendering processing that performs rendering based on the analysis result obtained by the interpreting processing.

Here, when rendering of a certain page is not performed, processing of subsequent pages is not affected. However, when interpreting of a certain page is not performed, processing of subsequent pages may be affected because the setting of a necessary print resource is not performed.

Therefore, when processing of a page somewhere in the middle is specified, regarding pages other than the specified page, the rendering units 531Y to 533Y each execute only partial interpreting that may particularly affect processing of the subsequent pages, and execute both interpreting and rendering of the specified page.

As above, the function of executing only partial interpreting of pages other than the specified page and reaching the specified page is referred to as the page skip function.

For example, when processing of the third page (P3) is specified, as illustrated in portion (A) of FIG. 6, execution of the entire processing of the first to third pages takes time. Thus, as illustrated in portion (B) of FIG. 6, the rendering units 531Y to 533Y each execute only partial interpreting of the first and second pages (P1 and P2) and execute both interpreting and rendering of the third page (P3).

Next, the operation of the RIP processor 51Y of the exemplary embodiment will be described with reference to the drawings.

As illustrated in FIGS. 3 and 4, when the order of output pages specified by the print job continuously increases, the RIP controller 52Y sequentially allocates and distributes the sent process request commands to the rendering units 531Y to 533Y. In this way, the process request commands are distributed in ascending order to all the rendering units 531Y to 533Y.

For example, the RIP controller 52Y distributes, in order, the distributed process request commands to the rendering units 531Y to 533Y, or simply selects a rendering unit for which there is no process request command to be processed, and distribute a process request command to the selected rendering unit.

However, when printing such as book printing or printing of selected pages is to be performed, the order of output pages is not necessarily the order from page 1. For example, in book printing, pages are arranged in order of appearance of bound pages. Therefore, pages are scattered and specified, as in page 1, page 100, page 2, page 99, . . . , and printing is performed.

For example, FIGS. 7A and 7B illustrate specific examples. FIG. 7A is a diagram illustrating the order of output pages in the case where four pages are imposed on one sheet. FIG. 7B is a diagram illustrating the order of output pages in the case where 16 pages are saddle-stitched.

FIG. 8 illustrates the manner in the case where, when a print job including pages that are not in consecutive order is to be executed, process request commands for specifying pages to be processed are mechanically distributed, in order, to the rendering units 531Y to 533Y. Note that, in FIG. 8, to simplify the following description, the case in which rendering is performed by the two rendering units 531Y and 532Y will be described.

In FIG. 8, output pages are specified as: P1, P5, P29, P13, P17, . . . . Thus, the rendering units 531Y and 532Y are also respectively specified to process inconsecutive pages. For example, process request commands in the order of P1, P29, P17, P9, P37, . . . are sent to the rendering unit 531Y. Also, process request commands in the order of P5, P13, P21, P33, P25, . . . are sent to the rendering unit 532Y.

Since the rendering unit 531Y performs rendering of P17 after executing rendering of P29, because of the above-described reason, it is necessary to restart the rendering unit 531Y and cause the rendering unit 531Y to re-execute interpreting from the beginning of the print job to P16. Further, since the rendering unit 531Y performs rendering of P9 after executing rendering of P17, it is necessary to restart the rendering unit 531Y and cause the rendering unit 531Y to re-execute interpreting from the beginning of the print job to P8.

Also, since process request commands are sent in descending order, as in P33, P25, . . . , to the rendering unit 532Y, it is similarly necessary to restart the rendering unit 532Y and cause the rendering unit 532Y to re-execute interpreting from the beginning of the print job to P24.

As above, when the order of pages of process request commands allocated by the page process request allocator 42 is not consecutive and pages specified to be rendered is not in ascending order, the RIP controller 52Y in this exemplary embodiment temporarily stores four process request commands to be distributed in the process request storage unit 54Y, and accordingly, the RIP controller 52Y sorts the process request commands in ascending order in which a page specified by a process request command distributed the next time is subsequent to a page specified by a process request command distributed the previous time, and distributes the sorted process request commands to the rendering units 531Y and 532Y.

Specifically, the RIP controller 52Y temporarily stores four process request commands to be distributed in the process request storage unit 54Y, selects process requests, starting with a process request command with a small page number specified to be rendered, from among the four process request commands stored in the process request storage unit 54Y, and distributes the selected process requests command to the rendering units 531Y and 532Y.

FIG. 9 is a flowchart illustrating the flow of an operation process performed by the RIP controller 52Y in the case where distribution processing is performed based on such a distribution method.

Firstly, the RIP controller 52Y determines whether there is a process request command allocated by the page process request allocator 42, that is, whether there is a process request command to be distributed (step S101).

When there is a process request command to be distributed, the RIP controller 52Y stores four process request commands in the process request storage unit 54Y (step S102).

The RIP controller 52Y selects, from among the process request commands stored in the process request storage unit 54Y, a process request command with the smallest page number specified to be rendered (step S103). The RIP controller 52Y distributes the selected process request command to one of the rendering units (CPSI) 531Y and 532Y (step S104).

The RIP controller 52Y repeats the processing in steps S103 and S104 until the process request storage unit 54Y becomes empty (no in step S105). When the process request storage unit 54Y becomes empty (yes in step S105), the RIP controller 52Y returns to the processing in step S101.

Referring now to FIGS. 10 to 16, the operation of the RIP controller 52Y distributing process request commands in the case where the print job illustrated in FIGS. 7A and 7B is extracted to print data on the basis of the flowchart illustrated in FIG. 9 will be described.

Firstly, when no process request command has been sent to either the rendering unit 531Y or 532Y yet, the RIP controller 52Y distributes the process request command of P1 to the rendering unit 531Y, and distributes the process request command of P5 to the rendering unit 532Y.

As illustrated in FIG. 10, the RIP controller 52Y temporarily stores four process request commands of P29, P13, P17, and P21 in the process request storage unit 54Y.

Figure 11:
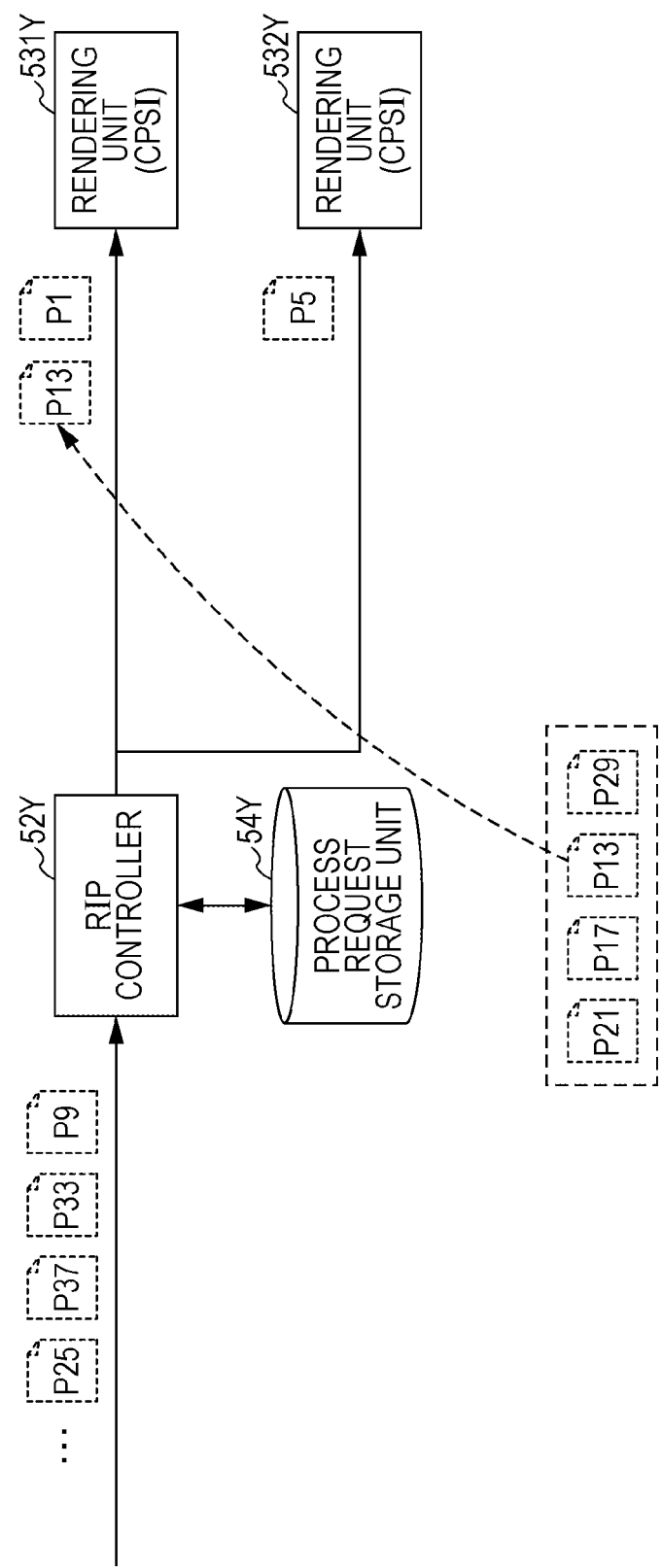
FIG. 11 is a diagram illustrating the operation of the RIP controller distributing process request commands in the case where the print job illustrated in FIGS. 7A and 7B is to be extracted to print data.

Next, as illustrated in FIG. 11, the RIP controller 52Y selects, from among the four process request commands stored in the process request storage unit 54Y, the process request command of P13, which is the smallest page number, and distributes the process request command of P13 to the rendering unit 531Y.

Figure 12:
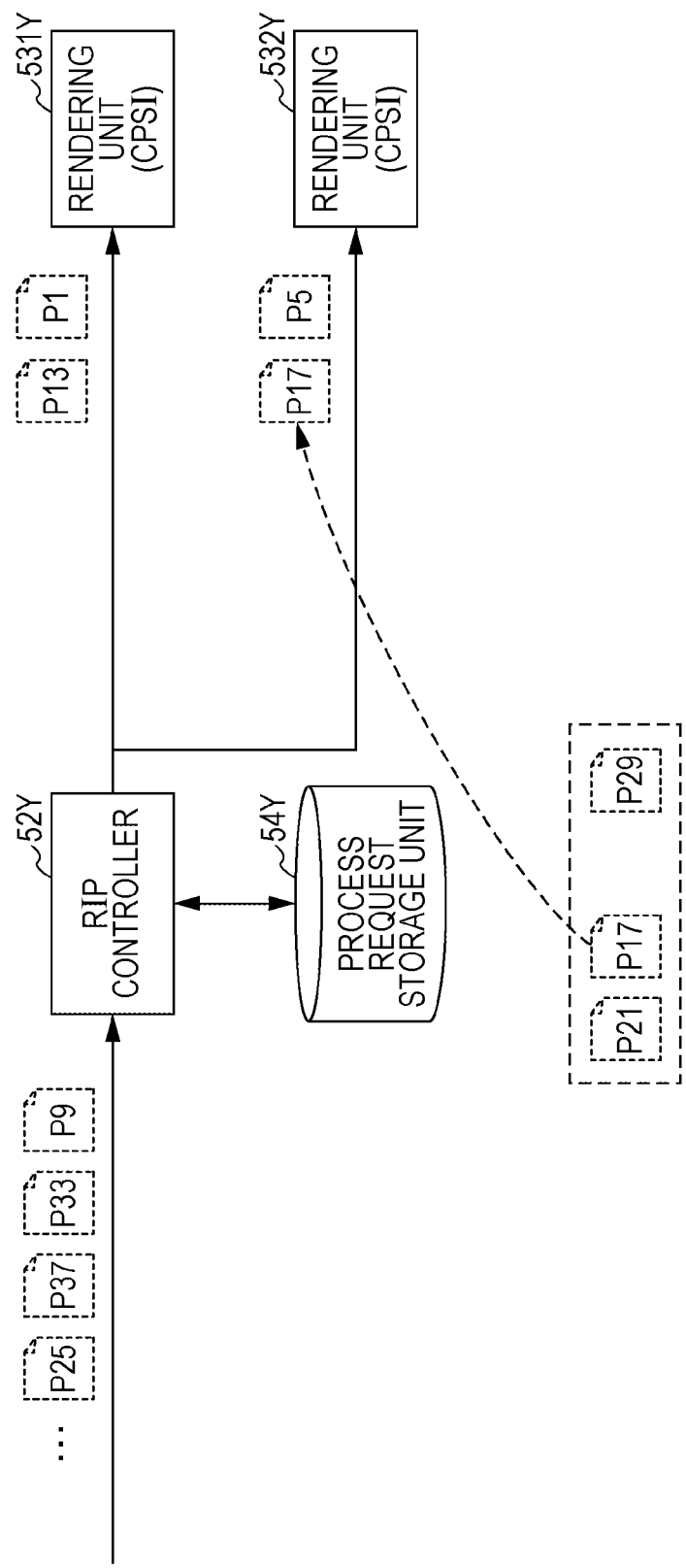
FIG. 12 is a diagram illustrating the operation of the RIP controller distributing process request commands in the case where the print job illustrated in FIGS. 7A and 7B is to be extracted to print data.

Next, as illustrated in FIG. 12, the RIP controller 52Y selects, from among the three process request commands stored in the process request storage unit 54Y, the process request command of P17, which is the smallest page number, and distributes the process request command of P17 to the rendering unit 532Y.

Figure 13:
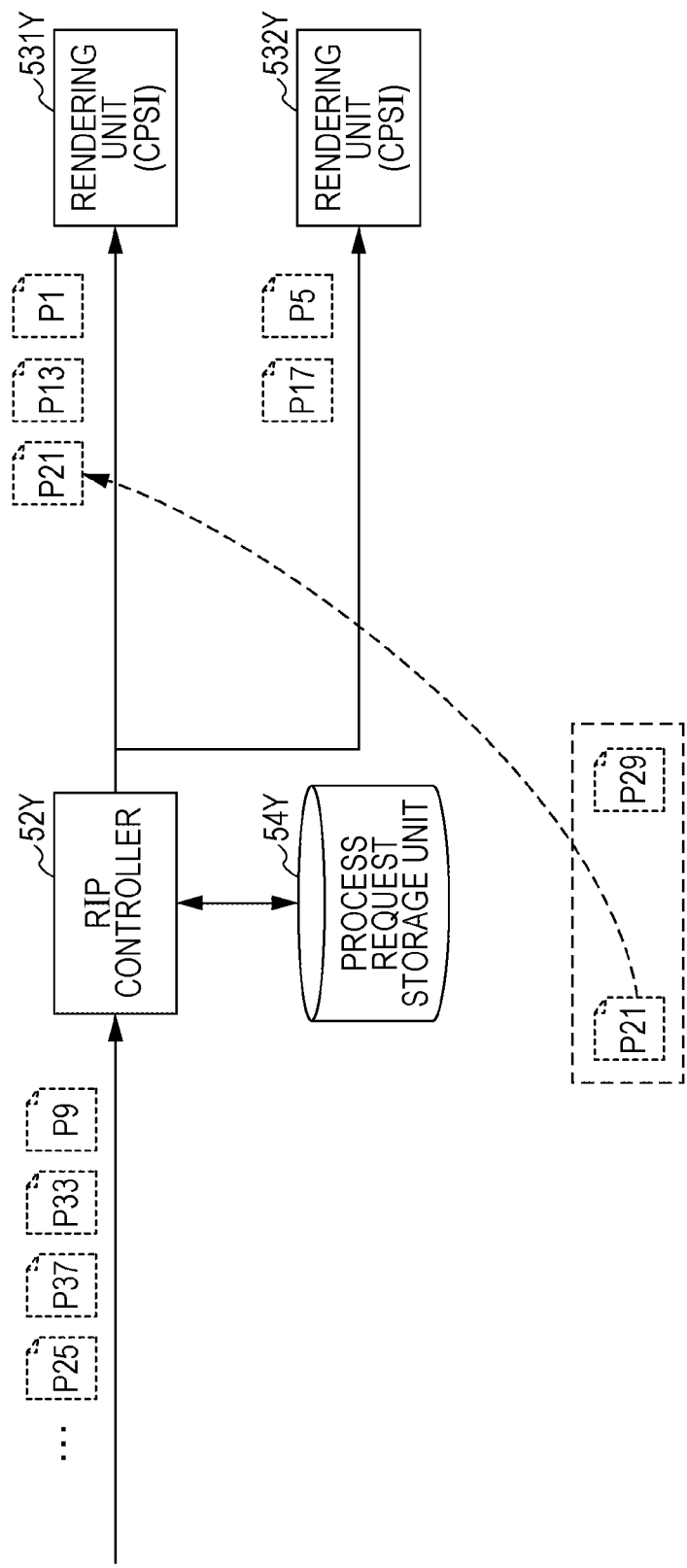
FIG. 13 is a diagram illustrating the operation of the RIP controller distributing process request commands in the case where the print job illustrated in FIGS. 7A and 7B is to be extracted to print data.

Similarly, as illustrated in FIG. 13, the RIP controller 52Y selects, from the two process request commands stored in the process request storage unit 54Y, the process request command of P21, which is the smallest page number, and distributes the process request command of P21 to the rendering unit 531Y.

Figure 14:
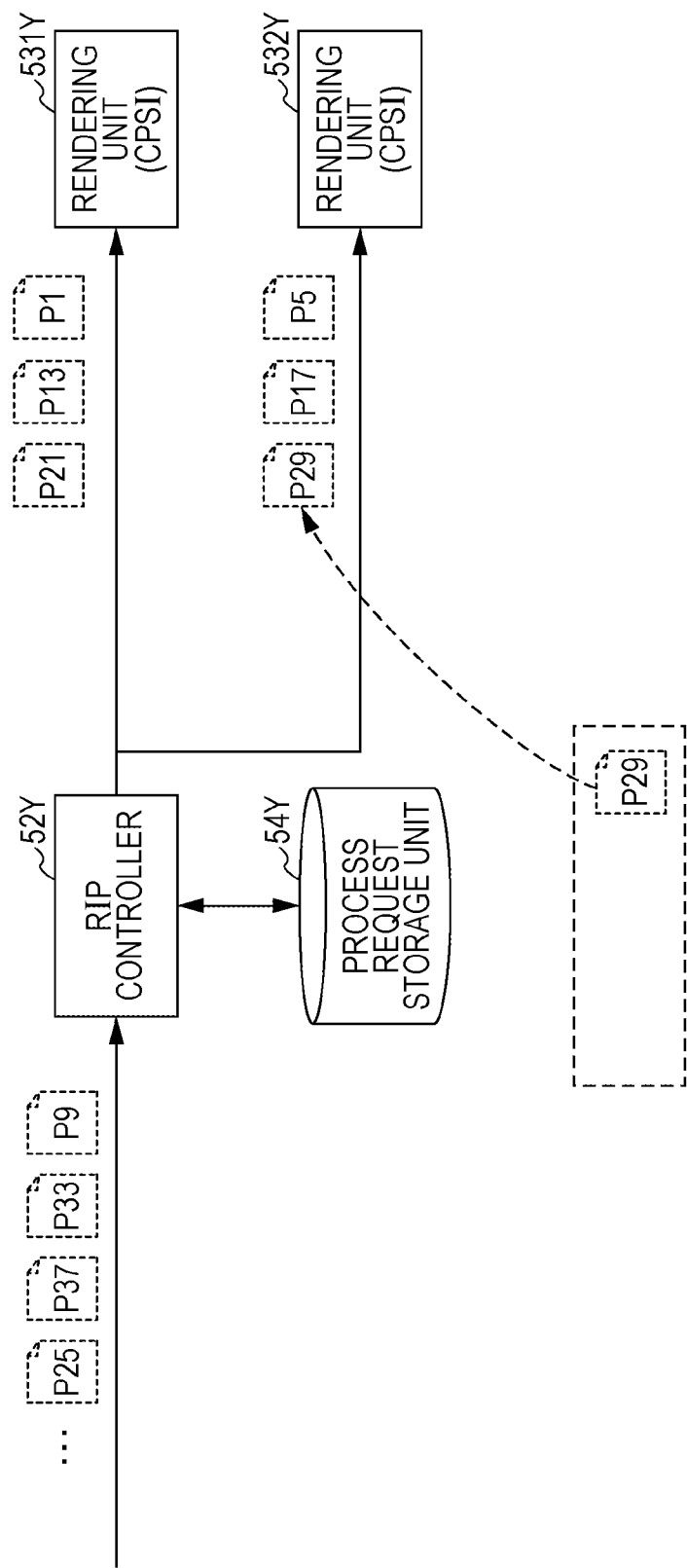
FIG. 14 is a diagram illustrating the operation of the RIP controller distributing process request commands in the case where the print job illustrated in FIGS. 7A and 7B is to be extracted to print data.

Finally, as illustrated in FIG. 14, the RIP controller 52Y selects the process request command of P29, which is the remaining process request command stored in the process request storage unit 54Y, and distributes the process request command of P29 to the rendering unit 532Y.

Figure 15:
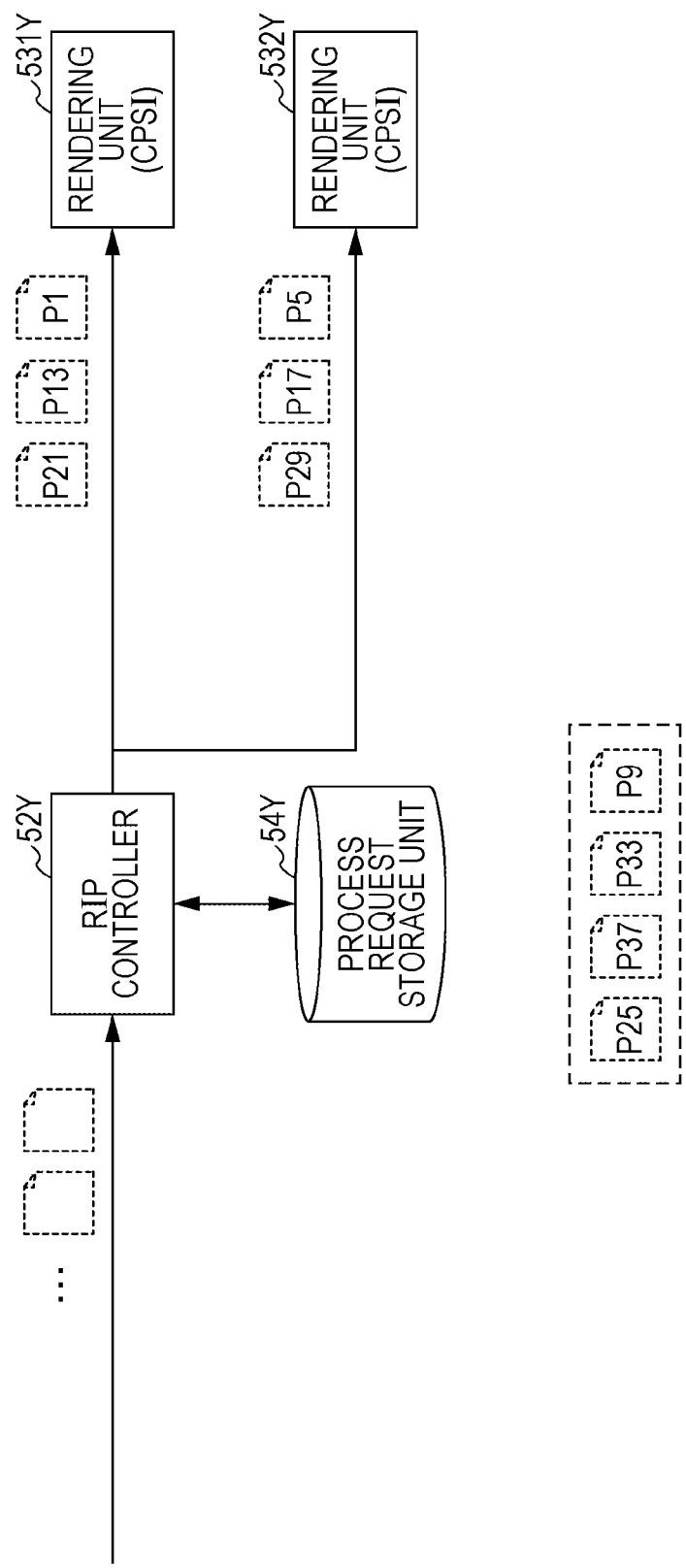
FIG. 15 is a diagram illustrating the operation of the RIP controller distributing process request commands in the case where the print job illustrated in FIGS. 7A and 7B is to be extracted to print data.

In response to the fact that the process request storage unit 54Y becomes empty, as illustrated in FIG. 15, the RIP controller 52Y stores the next four process request commands of P9, P33, P37, and P25 in the process request storage unit 54Y.

Figure 16:
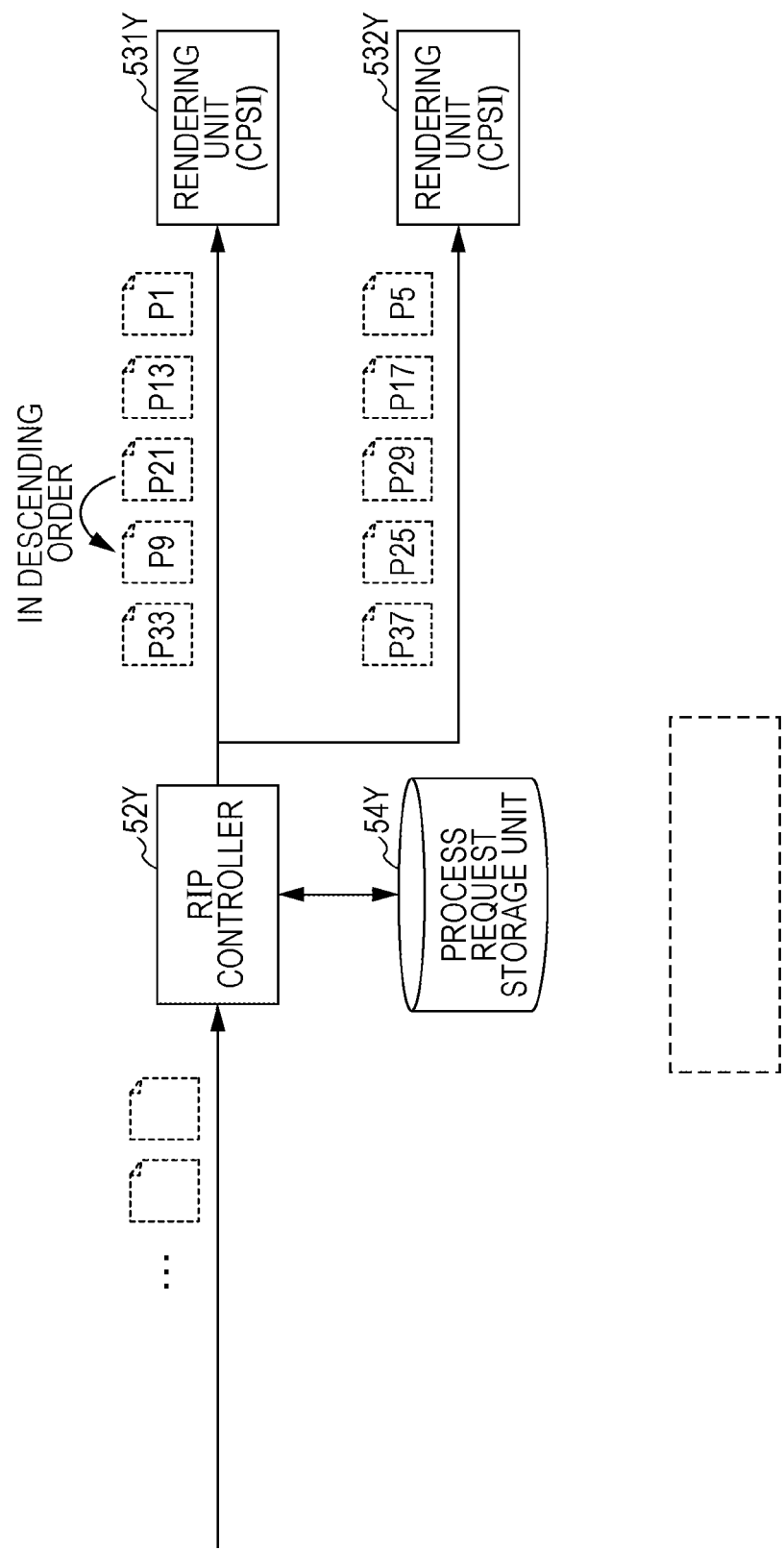
FIG. 16 is a diagram illustrating the operation of the RIP controller distributing process request commands in the case where the print job illustrated in FIGS. 7A and 7B is to be extracted to print data.

As illustrated in FIG. 16, the four process request commands of P9, P33, P37, and P25 stored in the process request storage unit 54Y are sequentially distributed, in order, starting from the smallest page number, to the rendering units 531Y and 532Y.

Note that, in FIGS. 10 to 16, it is illustrated that process request commands distributed to the rendering units 531Y and 532Y are accumulated. However, rendering performed by the rendering units 531Y and 532Y is executed in parallel to distribution of process request commands, and executed process request commands are deleted from a queue. Thus, process request commands are not accumulated in a waiting-to-be-processed queue, as illustrated in FIGS. 10 to 16.

As is clear from the comparison of FIGS. 8 and 16, when process request commands in the same sequence are to be distributed, the number of times the process request commands are distributed in descending order is three in FIG. 8, whereas that number in FIG. 16 is reduced to one by temporarily storing the process request commands in the process request storage unit 54Y and then distributing the stored process request commands.

Second Exemplary Embodiment

Next, a print system according to a second exemplary embodiment of the invention will be described.

The print system of this exemplary embodiment is different from that of the above-described first exemplary embodiment only in the method of distributing process request commands, which is performed by the RIP controller 52Y using the process request storage unit 54Y. Therefore, only the method of distributing process request commands, which is performed by the RIP controller 52Y, will be described in the following description.

The RIP controller 52Y in this exemplary embodiment does not always temporarily store process request commands to be distributed in the process request storage unit 54Y and then distribute the process request commands. Instead, when there is no rendering unit to which a process request command is distributable in ascending order, the RIP controller 52Y stores that process request command in the process request storage unit 54Y, and, when it becomes possible to distribute that process request commands in ascending order, the RIP controller 52Y distributes the process request command stored in the process request storage unit 54Y to one of the rendering units 531Y to 533Y.

Also, the RIP controller 52Y in this exemplary embodiment counts the number of times a process request command stored in the process request storage unit 54Y is passed by a subsequently received process request command. For a process request command whose counted number exceeds a threshold, the RIP controller 52Y distributes that process request command to one of the rendering units 531Y to 533Y, regardless of whether there is a rendering unit to which that process request command is distributable in ascending order.

Next, the operation of the print system of this exemplary embodiment will be described in detail with reference to the drawings.

Figure 17:
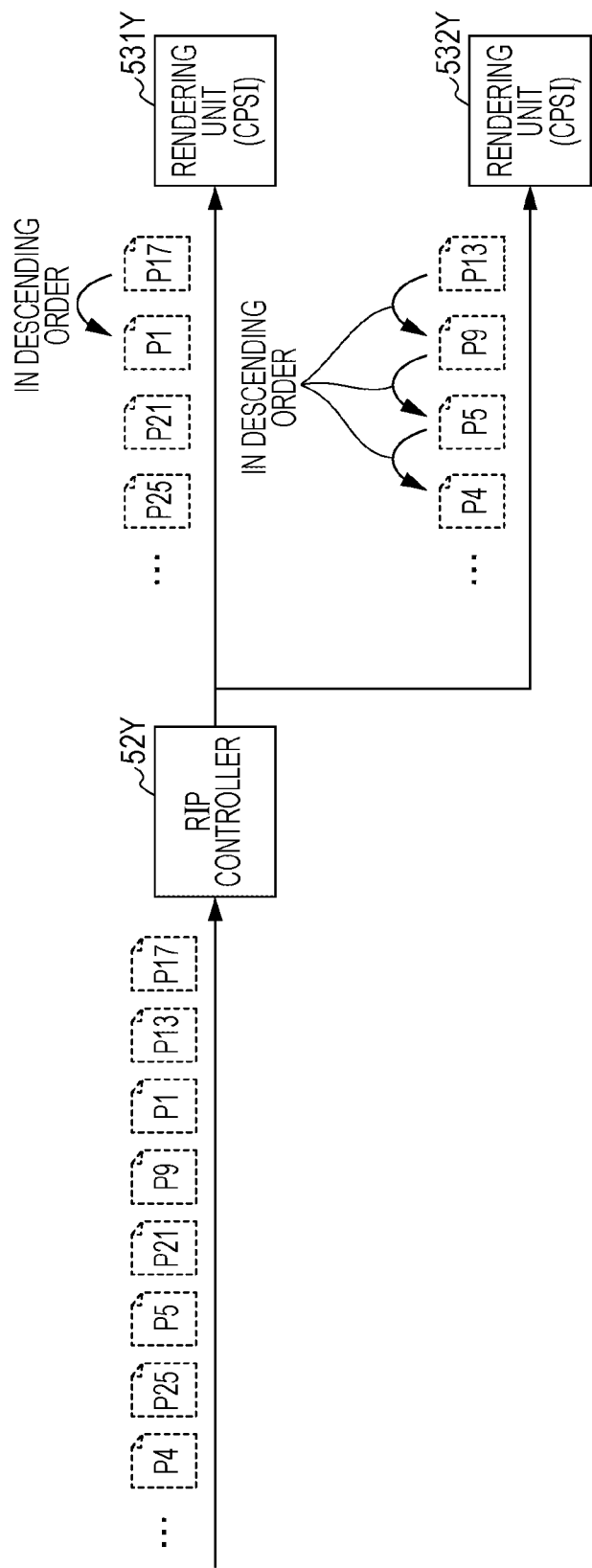
FIG. 17 is a diagram for describing the manner in the case where process request commands that are in a certain order of pages are not stored in a process request storage unit, but are distributed to rendering units.

Firstly, in order to describe the method of distributing process request commands, which is performed by the RIP controller 52Y in the print system of this exemplary embodiment, FIG. 17 illustrates the manner in the case where process request commands in a certain order of pages are not stored in the process request storage unit 54Y, but are distributed to the rendering units 531Y and 532Y.

Note that, also in description of this exemplary embodiment, in order to simplify the description, the case in which process request commands are distributed to the two rendering units 531Y and 532Y will be described.

In FIG. 17, output pages are specified as: P17, P13, P1, P9, P21, . . . . Thus, the rendering units 531Y and 532Y are also respectively specified to process inconsecutive pages. For example, process request commands in the order of P17, P1, P21, P25, . . . are sent to the rendering unit 531Y. Also, process request commands in the order of P13, P9, P5, P4, . . . are sent to the rendering unit 532Y.

That is, subsequent to the process request command of P17, the process request command of P1, which is in descending order, is distributed to the rendering unit 531Y.

Also, subsequent to the process request command of P13, the process request command of P9, which is in descending order, is distributed to the rendering unit 532Y. Subsequent to the process request command of P9, the process request command of P5, which is in descending order, is distributed to the rendering unit 532Y. Subsequent to the process request command of P5, the process request command of P4, which is in descending order, is distributed to the rendering unit 532Y.

Referring now to FIGS. 18 to 24, the operation of the RIP controller 52Y in this exemplary embodiment, which distributes process request commands in an order such as that illustrated in FIG. 17, will be described.

Firstly, when no process request command has been sent to either the rendering unit 531Y or 532Y yet, the RIP controller 52Y distributes the process request command of P17 to the rendering unit 531Y, and distributes the process request command of P13 to the rendering unit 532Y.

Figure 18:
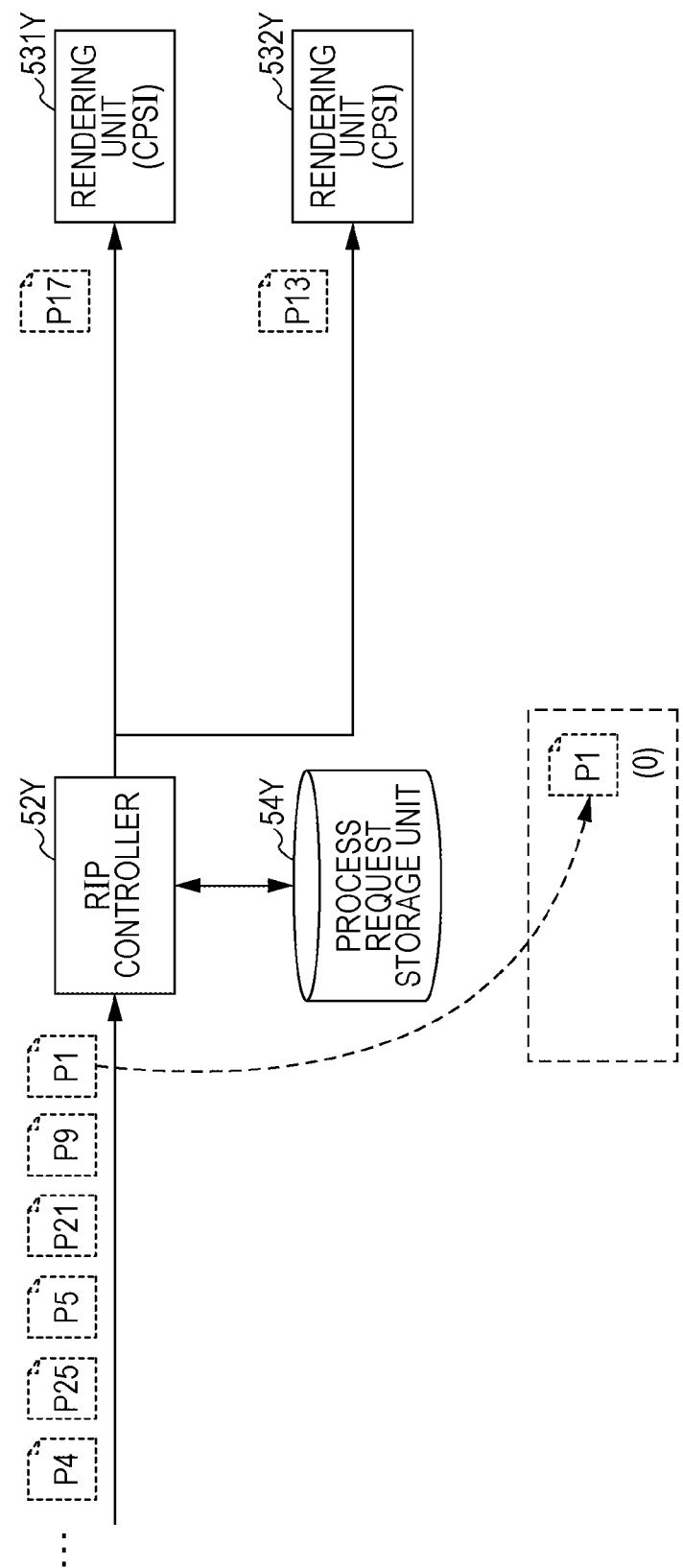
FIG. 18 is a diagram illustrating the operation of the RIP controller according to a second exemplary embodiment of the invention, which distributes process request commands in an order such as that illustrated in FIG. 17.

As illustrated in FIG. 18, the RIP controller 52Y tries to distribute the process request command of P1. However, since the process request command of P1 may not be distributed in ascending order to either the rendering unit 531Y or 532Y, the RIP controller 52Y stores the process request command of P1 in the process request storage unit 54Y. Here, the value of the counted number, set for the process request command of P1, indicating the number of times the process request command of P1 is passed by another process request command, is "0".

Figure 19:
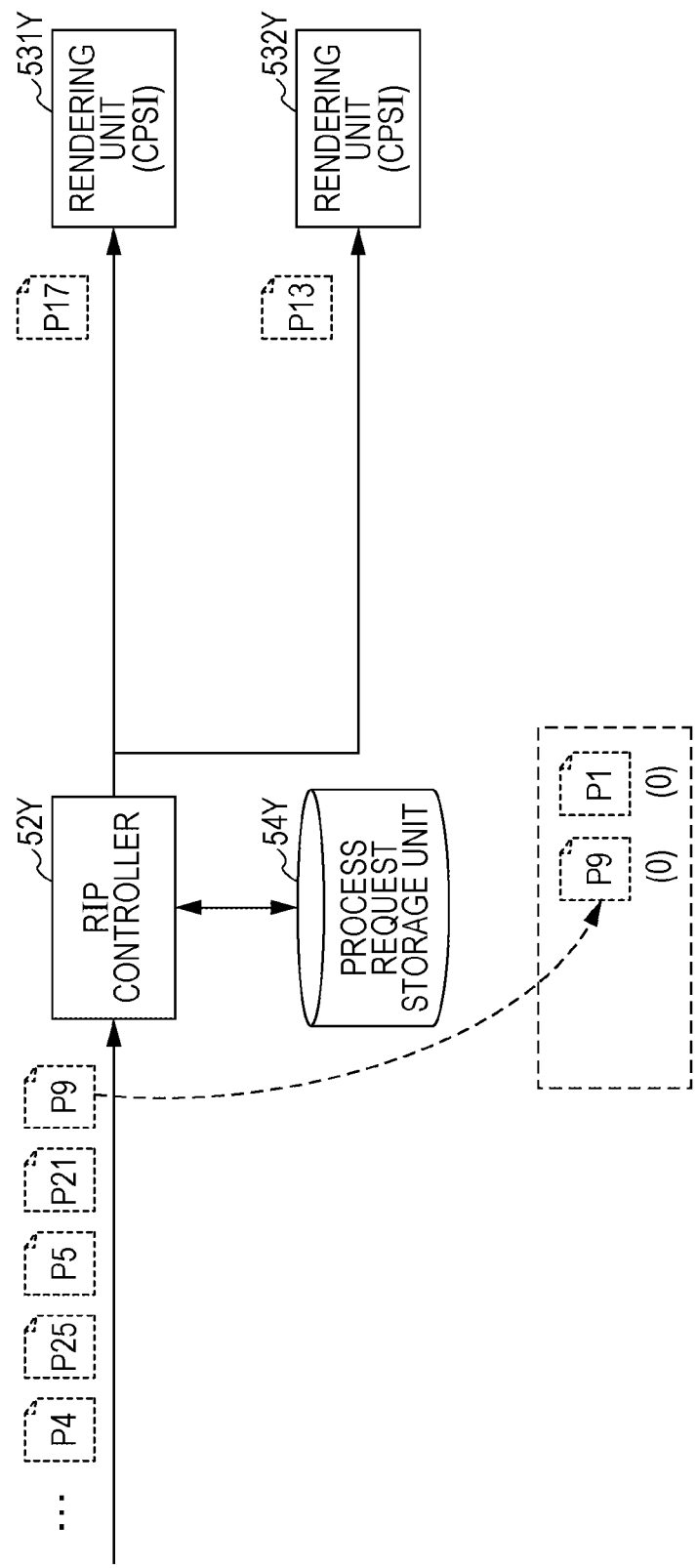
FIG. 19 is a diagram illustrating the operation of the RIP controller according to the second exemplary embodiment of the invention, which distributes process request commands in an order such as that illustrated in FIG. 17.

Next, as illustrated in FIG. 19, the RIP controller 52Y tries to distribute the process request command of P9. However, since the process request command of P9 may not be distributed in ascending order to either the rendering unit 531Y or 532Y, the RIP controller 52Y stores also the process request command of P9 in the process request storage unit 54Y. Here, the value of the counted number, set for the process request command of P9, indicating the number of times the process request command of P9 is passed by another process request command, is "0".

Figure 20:
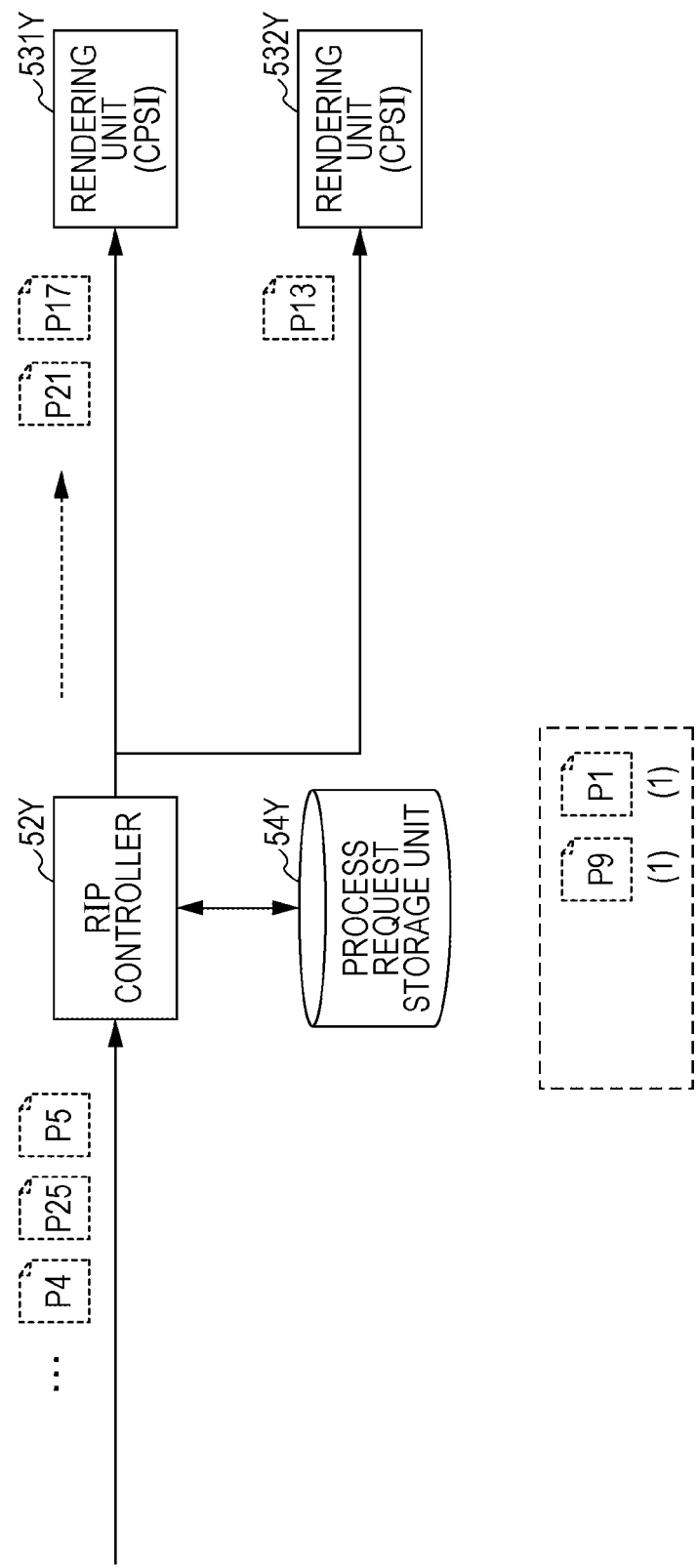
FIG. 20 is a diagram illustrating the operation of the RIP controller according to the second exemplary embodiment of the invention, which distributes process request commands in an order such as that illustrated in FIG. 17.

Next, as illustrated in FIG. 20, the RIP controller 52Y tries to distribute the process request command of P21. Since the process request command of P21 is distributable in ascending order to the rendering unit 531Y, the process request command of P21 is distributed to the rendering unit 531Y.

When distributing the process request command of P21 to the rendering unit 531Y, the RIP controller 52Y changes the value of the counted number of each of the process request commands of P1 and P9 stored in the process request storage unit 54Y to "1".

Figure 21:
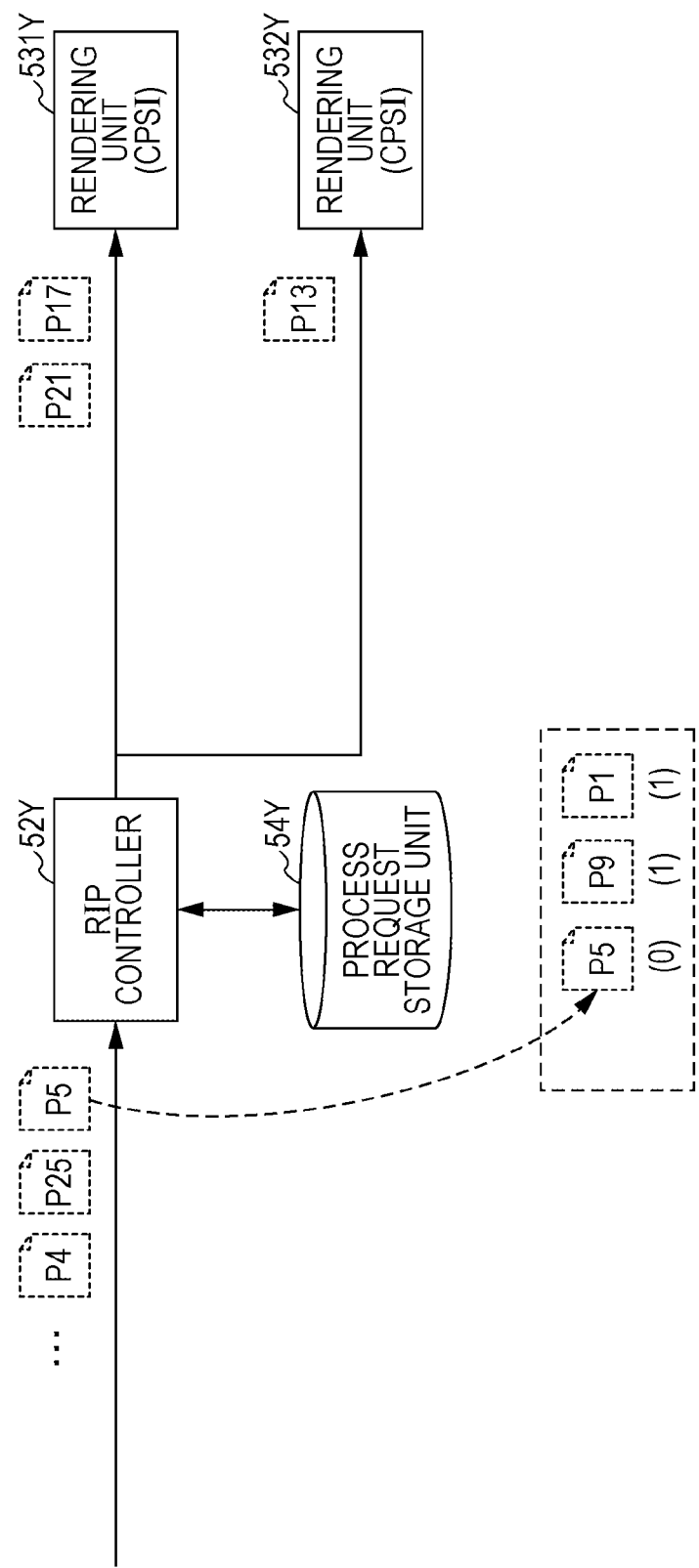
FIG. 21 is a diagram illustrating the operation of the RIP controller according to the second exemplary embodiment of the invention, which distributes process request commands in an order such as that illustrated in FIG. 17.

Next, as illustrated in FIG. 21, the RIP controller 52Y tries to distribute the process request command of P5. Since the process request command of P5 is not distributable in ascending order to either the rendering unit 531Y or 532Y, the RIP controller 52Y stores also the process request command of P5 in the process request storage unit 54Y. Here, the value of the counted number, set for the process request command of P5, indicating the number of times the process request command of P5 is passed by another process request command, is "0".

Figure 22:
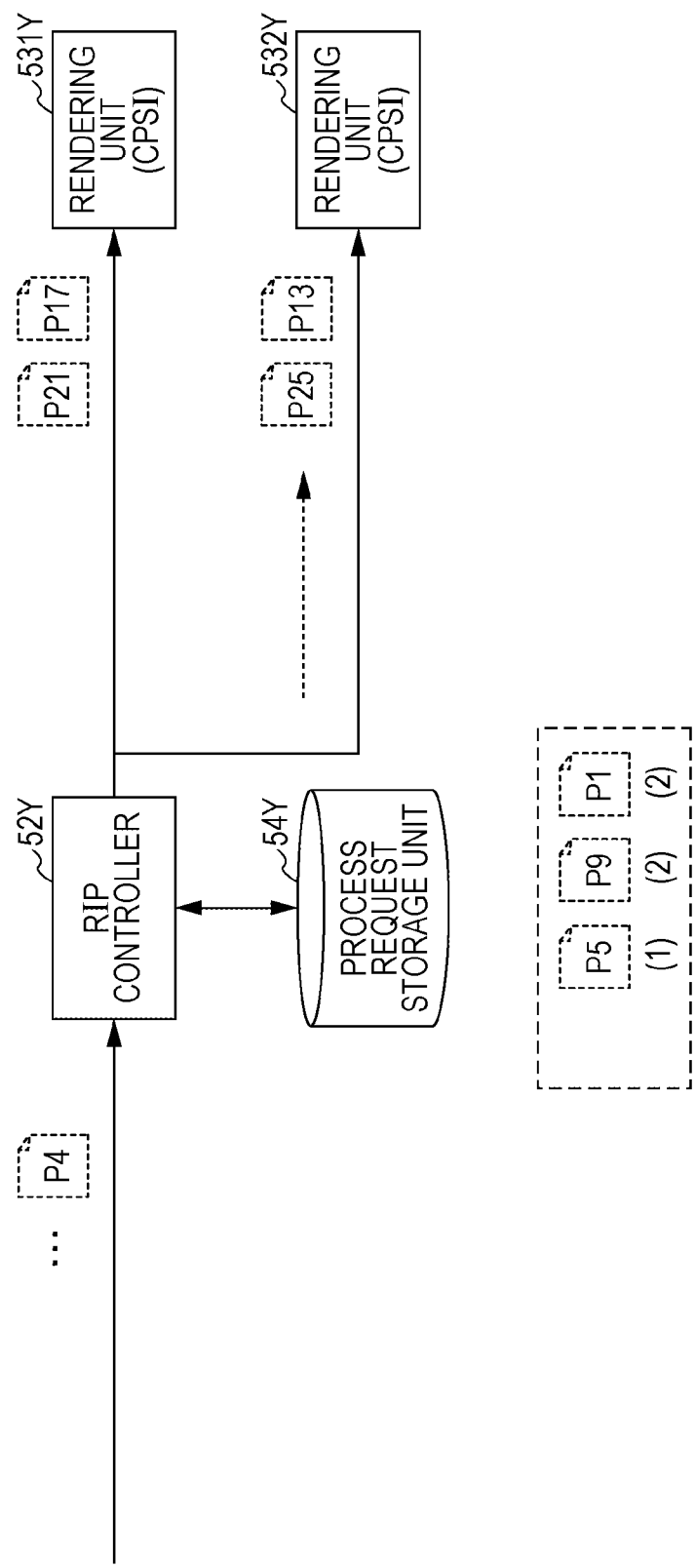
FIG. 22 is a diagram illustrating the operation of the RIP controller according to the second exemplary embodiment of the invention, which distributes process request commands in an order such as that illustrated in FIG. 17.

Next, as illustrated in FIG. 22, the RIP controller 52Y tries to distribute the process request command of P25. Since the process request command of P25 is distributable in ascending order to the rendering unit 532Y, the process request command of P25 is distributed to the rendering unit 532Y.

When distributing the process request command of P25 to the rendering unit 532Y, the RIP controller 52Y changes the value of the counted number of each of the process request commands of P1 and P9 stored in the process request storage unit 54Y to "2", and changes the value of the counted number of the process request command of P5 to "1".

Figure 23:
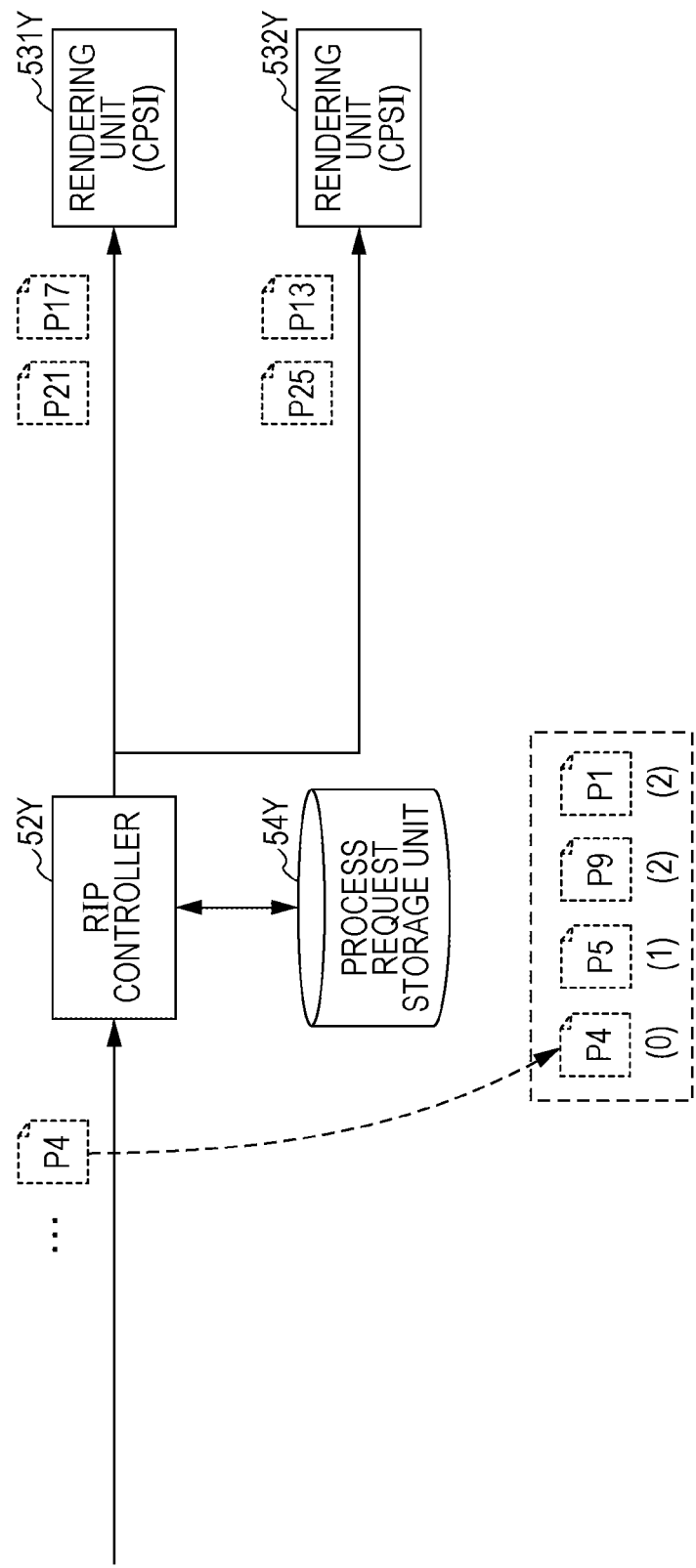
FIG. 23 is a diagram illustrating the operation of the RIP controller according to the second exemplary embodiment of the invention, which distributes process request commands in an order such as that illustrated in FIG. 17.

Next, as illustrated in FIG. 23, the RIP controller 52Y tries to distribute the process request command of P4. Since the process request command of P4 is not distributable in ascending order to either the rendering unit 531Y or 532Y, the RIP controller 52Y stores also the process request command of P4 in the process request storage unit 54Y. Here, the value of the counted number, set for the process request command of P4, indicating the number of times the process request command of P4 is passed by another process request command, is "0".

Figure 24:
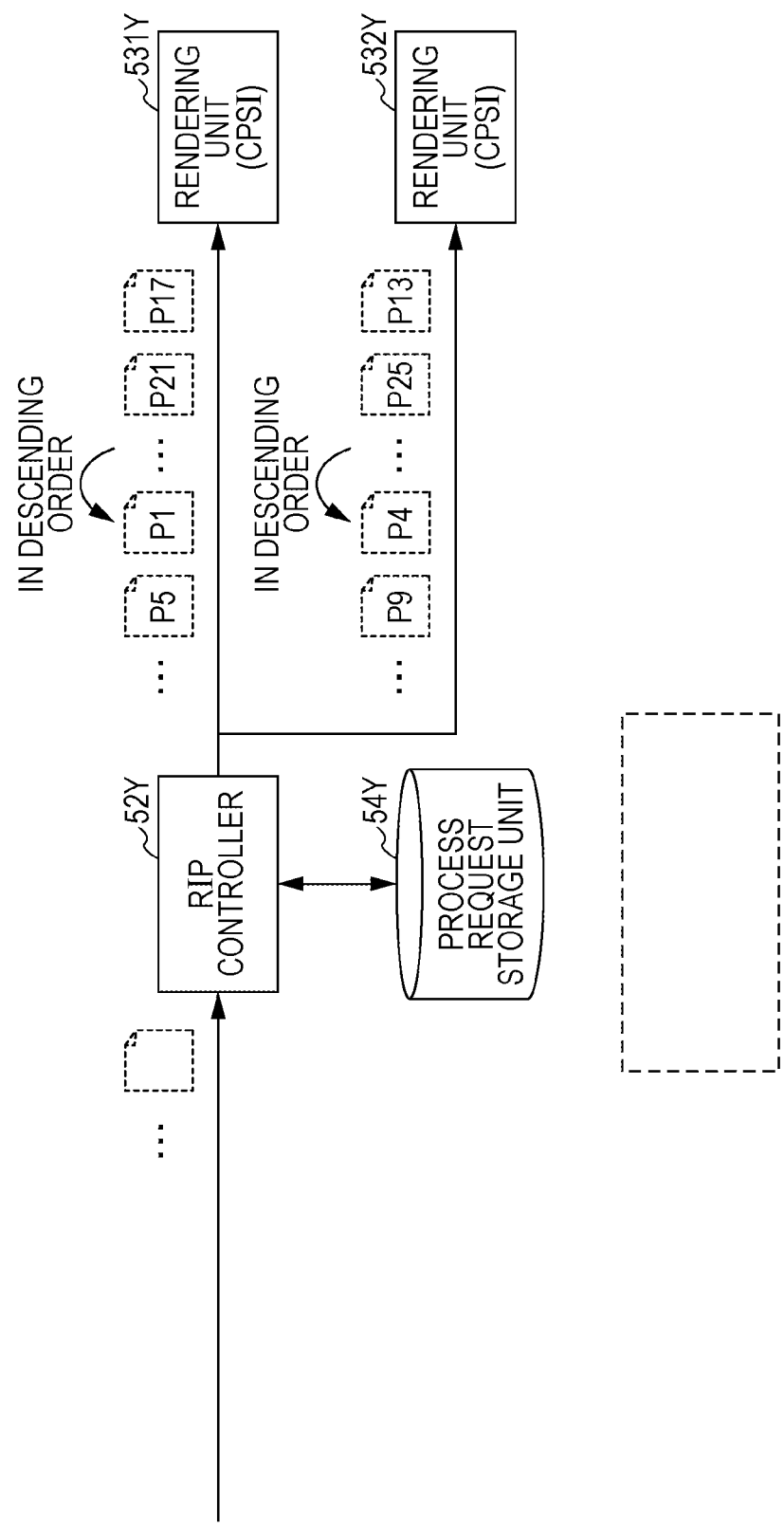
FIG. 24 is a diagram illustrating the operation of the RIP controller according to the second exemplary embodiment of the invention, which distributes process request commands in an order such as that illustrated in FIG. 17.

When the counted number of a process request command stored in the process request storage unit 54Y exceeds a set threshold (the value such as 5 or 10), as illustrated in FIG. 24, even if there exists no rendering unit to which the process request command is distributable in ascending order, the RIP controller 52Y forcedly distributes the process request command, whose counted number exceeds the threshold, to one of the rendering units 531Y and 532Y.

In the example illustrated in FIG. 24, four process request commands stored in the process request storage unit 54Y are distributed in ascending order of pages. In the example illustrated in FIG. 24, process request commands are distributed in descending order to both the rendering units 531Y and 532Y.

As is clear from the comparison of FIGS. 17 and 24, when process request commands in the same sequence are to be distributed, the number of times the process request commands are distributed in descending order is four in FIG. 17, whereas that number in FIG. 24 is reduced to two by temporarily storing the process request commands in the process request storage unit 54Y and then distributing the stored process request commands.

Upper Limit of Changing Order of Distribution

Note that, even when each of the RIP processors 51Y to 51K changes the order of pages to be rendered by using one of the methods in the first and second exemplary embodiments, the rendered image data is necessary to be printed in the order of pages specified by process request commands. Therefore, for each of the RIP processors 51Y to 51K, it is necessary to store the rendered image data in a buffer memory or the like and to output the rendered image data to the printer 1 in the order of pages specified by the original process request commands. When the order of pages to be rendered is greatly changed beyond the capacity of the buffer memory prepared in advance, the order of pages of rendered image data may become unchangeable, and printing may stop. It is thus necessary to set the range in which distribution of process request commands may be delayed from the original order of distribution, in accordance with the capacity of the buffer memory for storing the rendered image data.

To reduce the time until completion of printing, each of the RIP processors 51Y and 51K performs RIP processing, while the printer 1 executes printing. However, the print speed of the printer 1 printing each page is substantially constant, whereas the time involved in RIP processing of each page greatly varies depending on what is to be printed. Therefore, when the order of pages to be rendered is changed, as in this exemplary embodiment, rendering of a certain page may become subsequent to rendering of a page to be printed subsequent to the certain page, and image data of the certain page may not be completed by the time that print data is necessary for printing. As a result, printing may stop.

Figure 25:
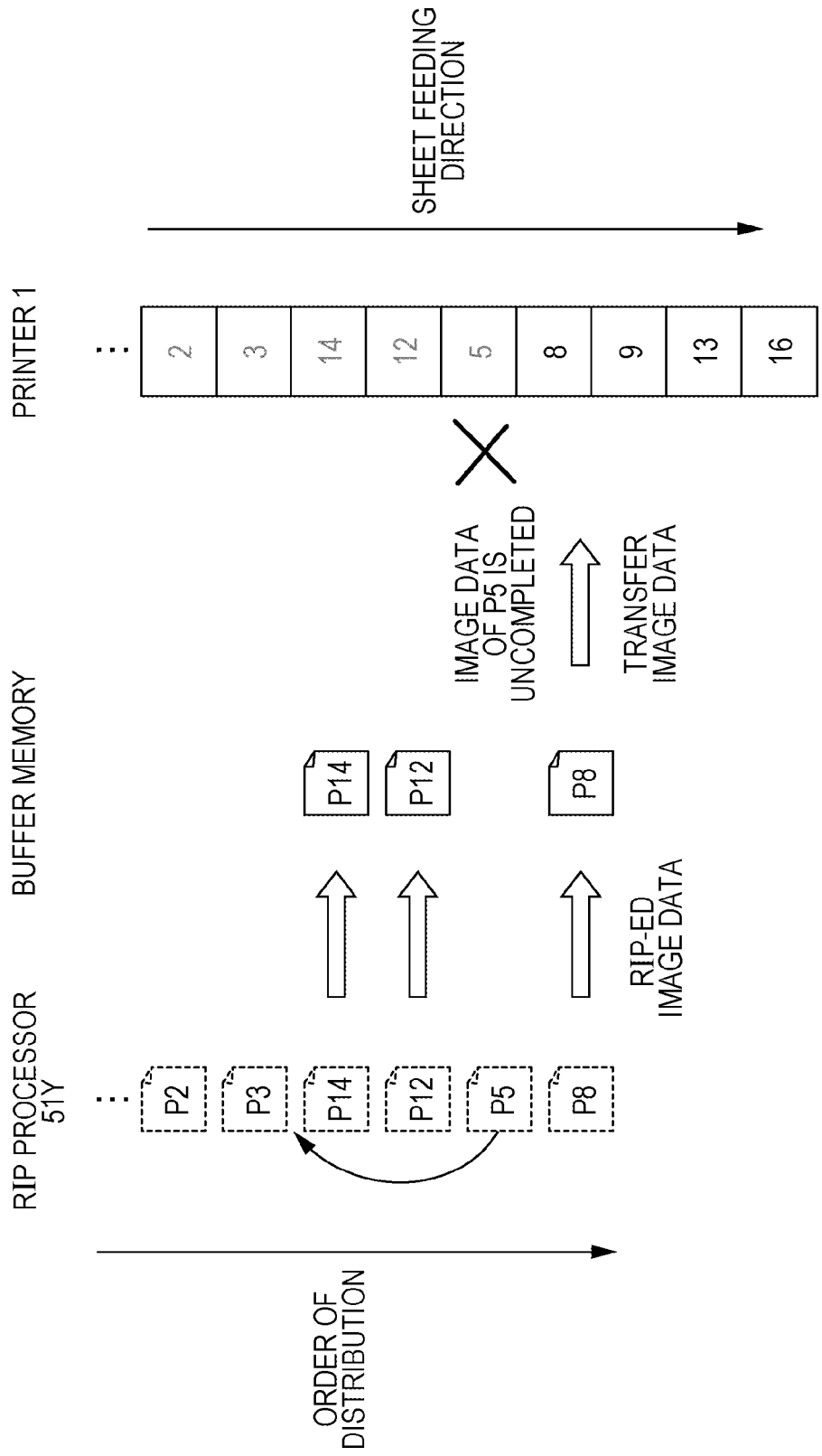
FIG. 25 is a diagram for describing the upper limit of a range in which distribution of process request commands may be delayed.

For example, as illustrated in FIG. 25, the case in which RIP processing (rendering) of the process request command of P5 is moved subsequent to P14 so that the order does not become descending order, to the extent possible, will be described. In such a case, after RIP-ed image data of P8, 12, and 14 is stored in the buffer memory, RIP processing of P5 is performed. However, when RIP processing of P12 and P14 is processing that takes a long time, the printer 1 may have to print the fifth page (P5) before RIP processing of P5 is completed, and accordingly, printing of P5 may not be executed. As a result, printing stops.

It is thus necessary to set a range in which distribution of process request commands may be delayed from the original order of distribution, and the order of distribution may be prevented from being changed beyond the set order of pages.

MODIFICATIONS

In the above-described first and second exemplary embodiments, the print job sending unit 43 sends the entire print job to the image processors 32Y to 32K. However, the exemplary embodiments are not limited to such a configuration. The exemplary embodiments are applicable to the case in which the entire print job including multiple pages is stored in a storage unit, and, instead of sending the entire print job from the print job sending unit 43 to the image processors 32Y to 32K, reference data for accessing the print job stored in the storage unit is sent.

In such a configuration, in the RIP processor 51Y, the RIP controller 52Y distributes reference data, together with process request commands, to the rendering units 531Y to 533Y. The rendering units 531Y to 533Y each access the print job stored in the storage unit on the basis of the reference data distributed from the RIP controller 52Y, and execute rendering by extracting the print job of a page specified by a corresponding one of the distributed process request commands to image data.

Also, in the above-described first and second exemplary embodiments, the case in which a print job described in PostScript, which is a page-dependent page description language, is executed has been described. However, the exemplary embodiments are not limited to this case. The exemplary embodiments are similarly applicable to the case in which a print job described in PDF, which is a page-independent page description language in which the details of a change regarding print settings on a certain page are not applied to other pages. In this case, a converter for converting PDF data to PostScript data may only necessary to be provided in the print job allocation processor 31 or all of the image processors 32Y to 32K. The print job sending unit 43 may only need to send the PostScript data, obtained by conversion performed by the converter, to the image processors 32Y to 32K.

With such a configuration, even when rendering of PDF data is performed using the Configurable PostScript Interpreter (CPSI) of the related art without using a rendering system of directly performing rendering of PDF without converting PDF to PostScript, parallel processing in units of pages is executed by multiple rendering units.

Further, in the above-described first and second exemplary embodiments, the process request storage unit 54Y is provided for the RIP controller 52Y which distributes process request commands. Alternatively, storage units that store multiple process request commands may be provided in the rendering units 531Y to 533Y which perform rendering. Process request commands distributed from the RIP controller 52Y may be temporarily stored in these storage units and then processed in an order different from the order of distribution.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
a plurality of rendering units that perform rendering in response to a print instruction described in a page description language;
a print instruction storage unit that stores the print instruction for printing a plurality of pages;
a distribution unit that sequentially distributes process requests and reference information to the plurality of rendering units, each of the process requests specifying which of the pages is to be rendered, the reference information being for accessing the print instruction stored in the print instruction storage unit; and
a process request storage unit capable of storing the plurality of process requests,
wherein the plurality of rendering units each execute rendering by accessing the print instruction stored in the print instruction storage unit on the basis of the reference information distributed by the distribution unit, and extracting a part of the print instruction of a page specified by a corresponding one of the process requests distributed by the distribution unit to image data, and
wherein, when there is a rendering unit to which a process request is distributable in ascending order of page numbers, the distribution unit distributes the process request to the rendering unit to which the process request is distributable in ascending order, and, when there is no rendering unit to which a process request is distributable in ascending order of the page numbers, the distribution unit temporarily stores the process request in the process request storage unit, selects a process request with a smallest page number from among a plurality of process requests stored in the process request storage unit and distributes the selected process request to one of the plurality of rendering units.

2. The print control apparatus according to claim 1, wherein the distribution unit counts the number of times that a process request stored in the process request storage unit is passed by a subsequently received process request, and if there is a process request whose counted number exceeds a threshold, distributes the process request to one of the plurality of rendering units regardless of whether there is a rendering unit to which the process request is distributable in ascending order.

3. The print control apparatus according to claim 2, wherein the plurality of rendering units each perform rendering of a page specified by a process request distributed by the distribution unit, by using a page skip function that executes only a command that affects a print setting of subsequent pages in data of the individual pages of the print instruction.

4. The print control apparatus according to claim 3, wherein, when a process request is distributed in descending order of page numbers, at least one of the plurality of rendering units re-executes processing of the print instruction from the first page.

5. The print control apparatus according to claim 2, wherein, when a process request is distributed in descending order of page numbers, at least one of the plurality of rendering units re-executes processing of the print instruction from the first page.

6. The print control apparatus according to claim 1, wherein the plurality of rendering units each perform rendering of a page specified by a process request distributed by the distribution unit, by using a page skip function that executes only a command that affects a print setting of subsequent pages in data of the individual pages of the print instruction.

7. The print control apparatus according to claim 6, wherein, when a process request is distributed in descending order of page numbers, at least one of the plurality of rendering units re-executes processing of the print instruction from the first page.

8. The print control apparatus according to claim 1, wherein, when a process request is distributed in descending order of page numbers, at least one of the plurality of rendering units re-executes processing of the print instruction from the first page.

9. An image forming system comprising:
a plurality of rendering units that perform rendering in response to a print instruction described in a page description language;
a print instruction storage unit that stores the print instruction for printing a plurality of pages;
a distribution unit that sequentially distributes process requests and reference information to the plurality of rendering units, each of the process requests specifying which of the pages is to be rendered, the reference information being for accessing the print instruction stored in the print instruction storage unit; and
a process request storage unit capable of storing the plurality of process requests; and
an output unit that outputs an image based on image data obtained by rendering performed by the plurality of rendering units,
wherein the plurality of rendering units each execute rendering by accessing the print instruction stored in the print instruction storage unit on the basis of the reference information distributed by the distribution unit, and extracting a part of the print instruction of a page specified by a corresponding one of the process requests distributed by the distribution unit to image data, and
wherein, when there is a rendering unit to which a process request is distributable in ascending order of page numbers, the distribution unit distributes the process request to the rendering unit to which the process request is distributable in ascending order, and, when there is no rendering unit to which a process request is distributable in ascending order of the page numbers, the distribution unit temporarily stores the process request in the process request storage unit, selects a process request with a smallest page number from among a plurality of process requests stored in the process request storage unit and distributes the selected process request to one of the plurality of rendering units.

10. A non-transitory computer readable medium storing a program causing a computer to execute a process, the process comprising:
storing a print instruction for printing a plurality of pages;
in sequential distribution of process requests, each specifying which of the pages is to be rendered, and reference information for accessing the stored print instruction to a plurality of rendering units performing rendering in response to the print instruction described in a page description language, when there is a rendering unit to which a process request is distributable in ascending order of page numbers, distributing the process request to the rendering unit to which the process request is distributable in ascending order, and, when there is no rendering unit to which a process request is distributable in ascending order of the page numbers, temporarily storing the process request in the process request storage unit, selecting a process request with a smallest page number from among a plurality of process requests stored in the process request storage unit and distributing the selected process request to one of the plurality of rendering units;
executing, by each of the plurality of rendering units, rendering by accessing the stored print instruction on the basis of the distributed reference information, and extracting a part of the print instruction of a page specified by a corresponding one of the distributed process requests to image data; and
outputting an image based on image data obtained by rendering performed by the plurality of rendering units.

* * * * *